RE25344

April 5, 1960 W. H. LOCKWOOD 2,931,535

TIERABLE AND NESTABLE RECEPTACLE

Filed Feb. 6, 1957 17 Sheets-Sheet 1

INVENTOR.
WARREN H. LOCKWOOD
BY
Hyde, Meyer, Baldwin & Doran
ATTORNEYS

April 5, 1960 W. H. LOCKWOOD 2,931,535

TIERABLE AND NESTABLE RECEPTACLE

Filed Feb. 6, 1957 17 Sheets-Sheet 2

INVENTOR.
WARREN H. LOCKWOOD
BY
Hyde, Meyer, Baldwin & Doran
ATTORNEYS

TIERABLE AND NESTABLE RECEPTACLE

Filed Feb. 6, 1957 17 Sheets-Sheet 3

INVENTOR.
WARREN H. LOCKWOOD
BY
Hyde, Meyer, Baldwin & Doran
ATTORNEYS

TIERABLE AND NESTABLE RECEPTACLE

Filed Feb. 6, 1957 17 Sheets-Sheet 4

INVENTOR.
WARREN H. LOCKWOOD
BY
Hyde, Meyer, Baldwin & Doran
ATTORNEYS

INVENTOR.
WARREN H. LOCKWOOD
BY
Hyde, Meyer, Baldwin & Doran
ATTORNEYS

TIERABLE AND NESTABLE RECEPTACLE

Filed Feb. 6, 1957 17 Sheets-Sheet 6

INVENTOR.
WARREN H. LOCKWOOD
BY
Hyde, Meyer, Baldwin & Doran
ATTORNEYS

TIERABLE AND NESTABLE RECEPTACLE

Filed Feb. 6, 1957 17 Sheets-Sheet 7

INVENTOR.
WARREN H. LOCKWOOD
BY
Hyde, Meyer, Baldwin & Doran
ATTORNEYS

April 5, 1960 W. H. LOCKWOOD 2,931,535

TIERABLE AND NESTABLE RECEPTACLE

Filed Feb. 6, 1957 17 Sheets-Sheet 8

INVENTOR.
WARREN H. LOCKWOOD
BY
Hyde, Meyer, Baldwin & Doran
ATTORNEYS

April 5, 1960 W. H. LOCKWOOD 2,931,535

TIERABLE AND NESTABLE RECEPTACLE

Filed Feb. 6, 1957 17 Sheets-Sheet 9

INVENTOR.
WARREN H. LOCKWOOD
BY
Hyde, Meyer, Baldwin & Doran
ATTORNEYS

TIERABLE AND NESTABLE RECEPTACLE

Filed Feb. 6, 1957 17 Sheets-Sheet 10

INVENTOR.
WARREN H. LOCKWOOD
BY
Hyde, Meyer, Baldwin & Doran
ATTORNEYS

April 5, 1960 W. H. LOCKWOOD 2,931,535

TIERABLE AND NESTABLE RECEPTACLE

Filed Feb. 6, 1957 17 Sheets-Sheet 11

INVENTOR.
WARREN H. LOCKWOOD
BY
Hyde, Meyer, Baldwin & Doran
ATTORNEYS

April 5, 1960 W. H. LOCKWOOD 2,931,535

TIERABLE AND NESTABLE RECEPTACLE

Filed Feb. 6, 1957 17 Sheets-Sheet 12

INVENTOR.
WARREN H. LOCKWOOD
BY
Hyde, Meyer, Baldwin & Doran
ATTORNEYS

INVENTOR.
WARREN H. LOCKWOOD
BY
Hyde, Meyer, Baldwin & Doran
ATTORNEYS

TIERABLE AND NESTABLE RECEPTACLE

INVENTOR.
WARREN H. LOCKWOOD
BY
Hyde, Meyer, Baldwin & Doran
ATTORNEYS

INVENTOR.
WARREN H. LOCKWOOD
BY
Hyde, Meyer, Baldwin & Doran
ATTORNEYS

TIERABLE AND NESTABLE RECEPTACLE

Filed Feb. 6, 1957 17 Sheets-Sheet 16

INVENTOR.
WARREN H. LOCKWOOD
BY
Hyde, Meyer, Baldwin & Doran
ATTORNEYS

INVENTOR.
WARREN H. LOCKWOOD
BY
Hyde, Meyer, Baldwin & Doran
ATTORNEYS 2,931,535

TIERABLE AND NESTABLE RECEPTACLE

Warren H. Lockwood, Downey, Calif.

Application February 6, 1957, Serial No. 638,646
28 Claims. (Cl. 220—97)

This invention relates to improvements in receptacles, and more particularly to that type of receptacle adapted to be tiered when in use and to be nested when empty.

Wherever in this specification and claims I have referred to these receptacles as "trays," I intend such term to include crates, boxes, baskets, trays and similar receptacles which may be stacked one upon another when in use and nested when empty for conservation of space.

An object of the present invention is to provide a tray which when stacked or tiered with a like tray, one on top of the other, in vertical alignment, fixed points of support near the top edge of the lower unit and near the bottom edge of the upper unit, are in conflicting obstruction to each other so that one unit is tiered upon the other. I then provide an opening or clearway, extending in vertical alignment from the point of tiering support to at least that level in the tray occupied by the bottom of the upper tray when the parts are in nested position. The trays are so constructed that the conflicting obstruction of the support points of two stacked or tiered units may be disengaged, in order to nest, by shifting the top unit a short distance within the confines of the lower unit and while maintaining the bottom of the upper unit in substantially the same plane.

In the first described embodiment, this shifting of the upper unit is provided by rotating the top unit a few degrees about a generally central vertical axis relative to the lower unit, so that the conflicting support points clear and are adapted to pass each other as the upper unit moves toward nesting position into the lower unit. When the support points near the bottom of the upper unit have passed the obstruction of the coacting support points near the upper edge of the lower unit, the upper unit may be rotated back into vertical alignment with the lower unit and the clearway permits the further lowering of the upper unit down into finally nested position.

In the later described embodiment, this shifting of the upper unit is linear, generally parallel to one side of the tray, until the tiering support points clear each other permitting the upper tray to move downwardly, through the clearways provided to nesting position.

My improved tray as set forth herein may be made of cast aluminum, sheet metal, plastic, spaced wires or any other material or construction embodying the principles set forth hereinafter. The sides and bottom of the tray may be substantially solid or of open construction as desired, or the invention may be applied to trays as hereinafter set forth having almost no sides except sufficient side portions to sustain the upper edge defining portions necessary to the carrying out of my invention as will hereinafter appear.

This invention is related in a general way to another tierable and nestble receptacle disclosed and claimed in my copending application Serial No. 309,885, filed September 16, 1952, now Patent No. 2,782,936. The similarity between the present application and my copending application is that they both disclose tierable and nestable receptacles having no moving parts whatsoever. The broad distinction between this and my copending application mentioned above is that in the copending application the upper unit is nested with the lower unit by tilting or rocking the upper unit about a generally horizontal axis, while in the present application the nesting of the two units is arrived at by a slight shifting motion of one unit relative to the other moving the shiftable unit in the same horizontal plane.

Other objects and advantages of the present invention will be set forth in the accompanying specification and drawings and the essential features thereof are set forth in the appended claims.

In the drawings,

Figs. 1 and 2 show one embodiment of my invention wherein Fig. 1 is a perspective view of a tray, while Fig. 2 is a top plan view of the tray of Fig. 1 with the lower part of an upper unit indicated in section as entering into the lower tray;

Figs. 3 and 4 show a second form of my invention wherein Fig. 3 is a perspective view of a single tray while Fig. 4 is a top plan view of such a tray with the lower part of an upper tray shown in section as entering into the lower tray;

Figure 5:
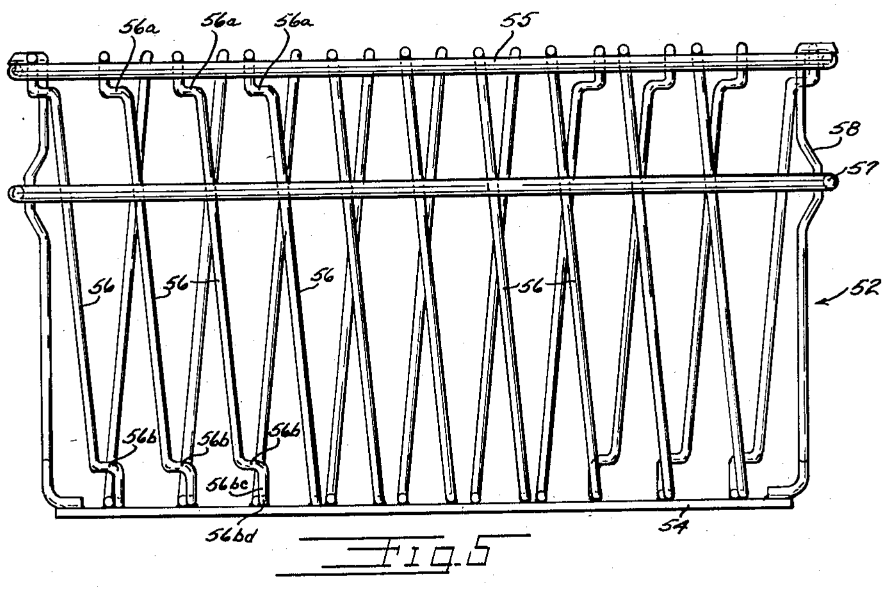
Figure 6:
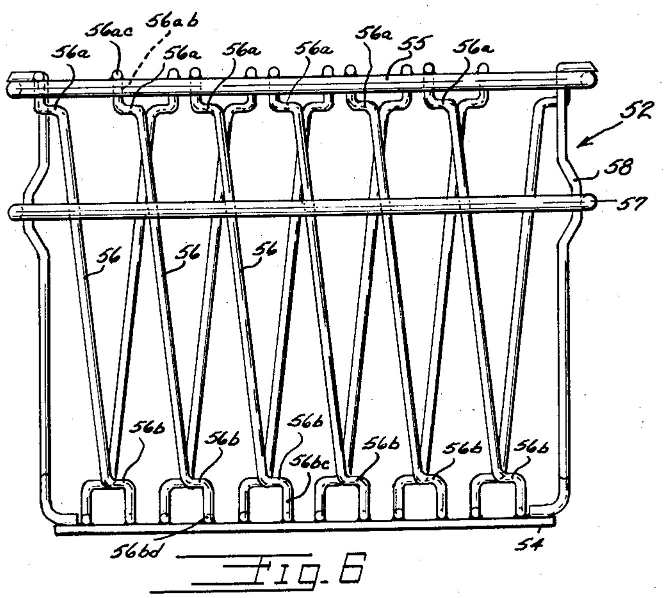
Figure 7:
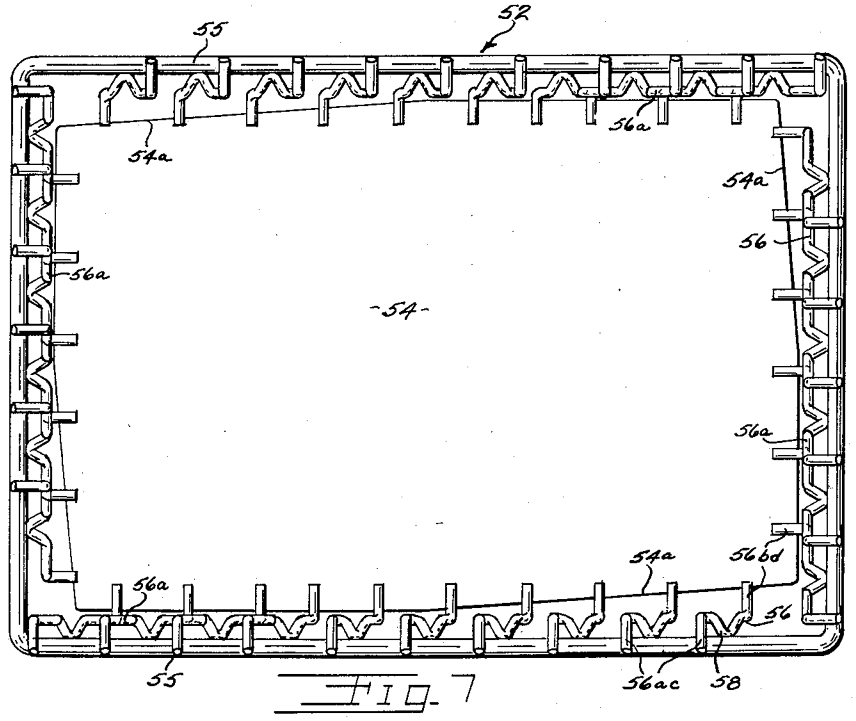
Figure 8:
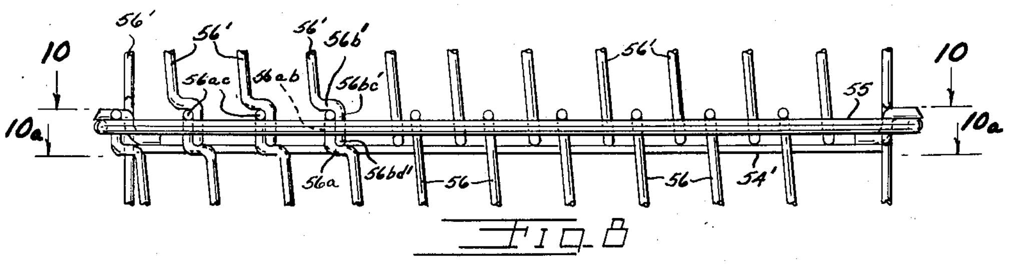
Figure 9:
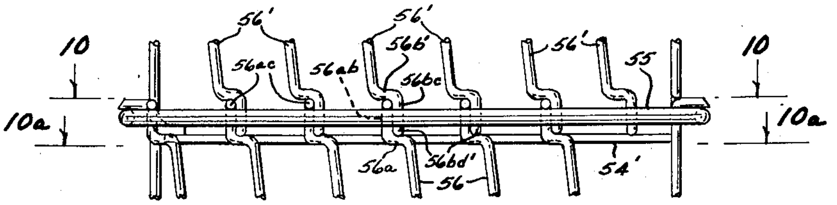
Figures 10, 11:
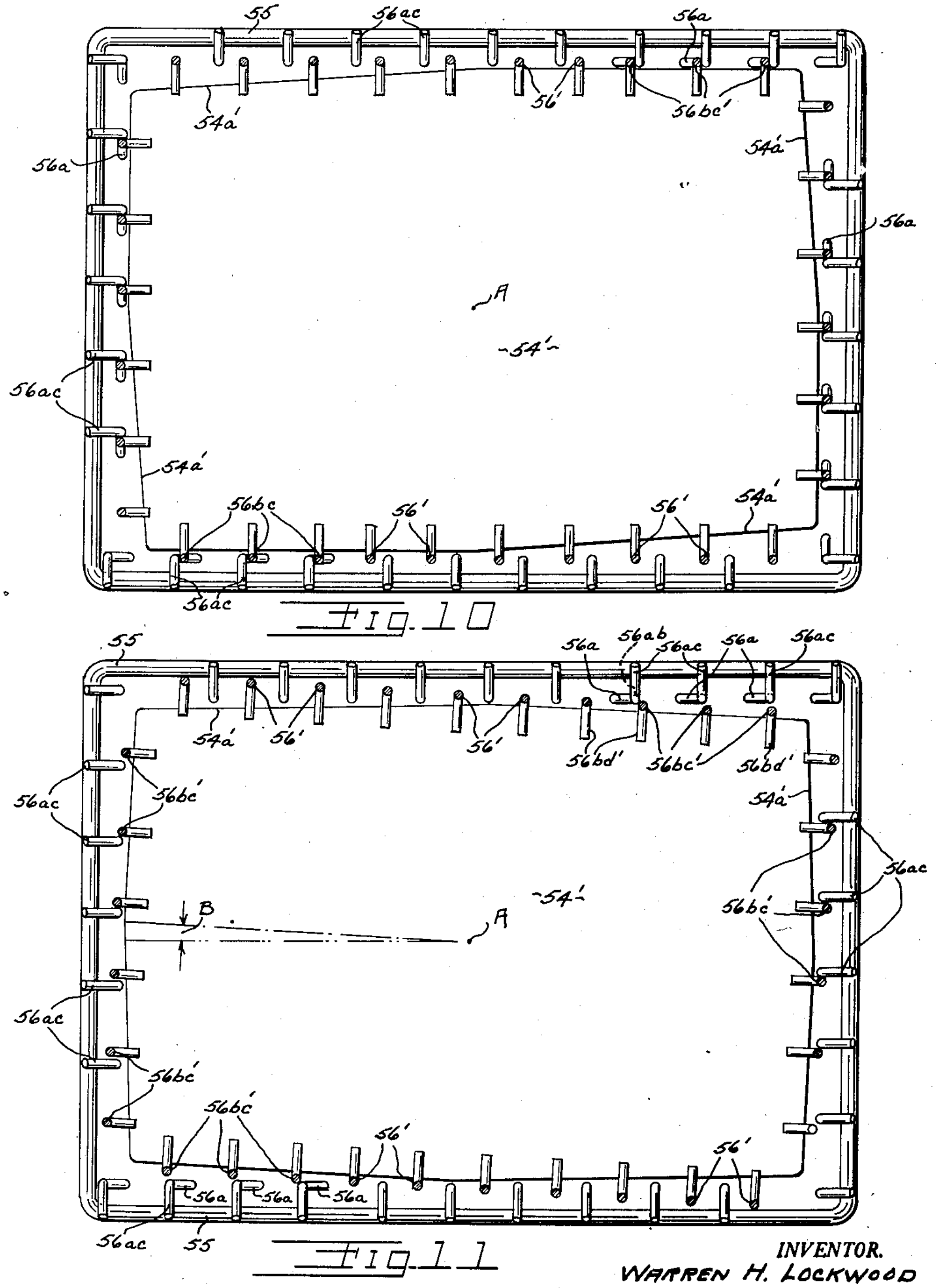
Figure 12:
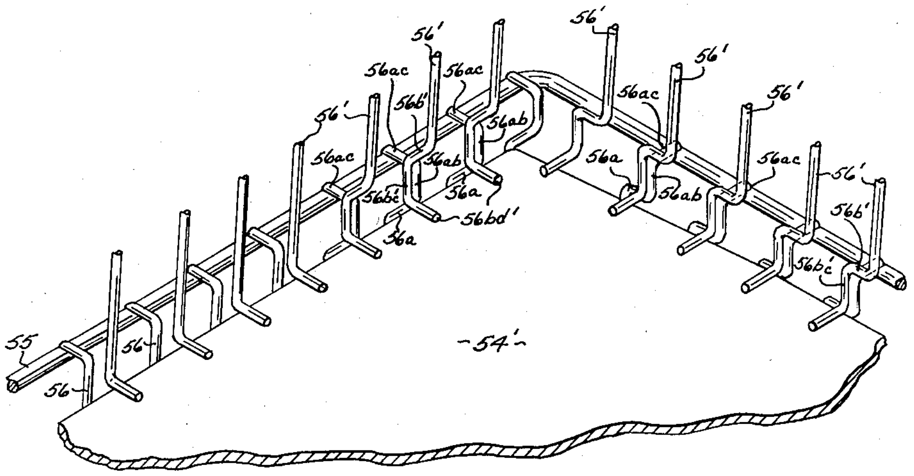
Figure 13:
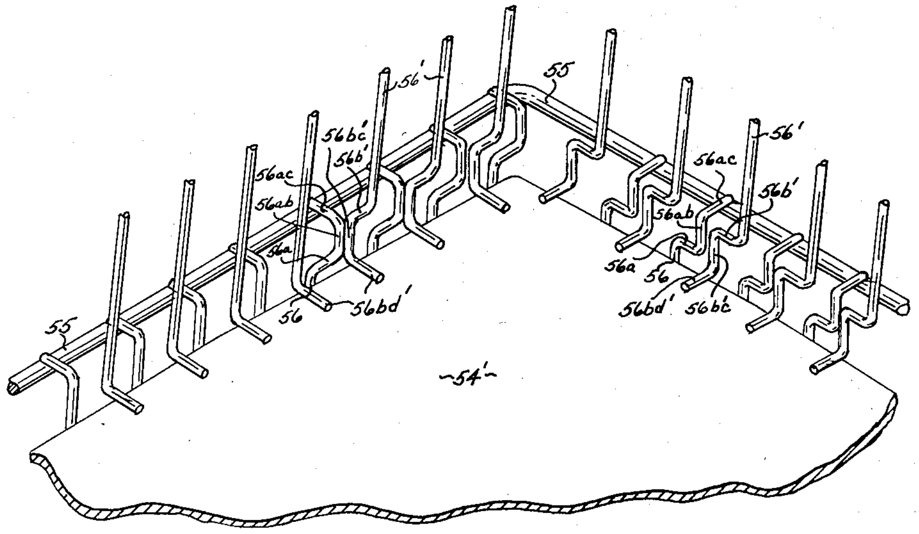
Figure 14:
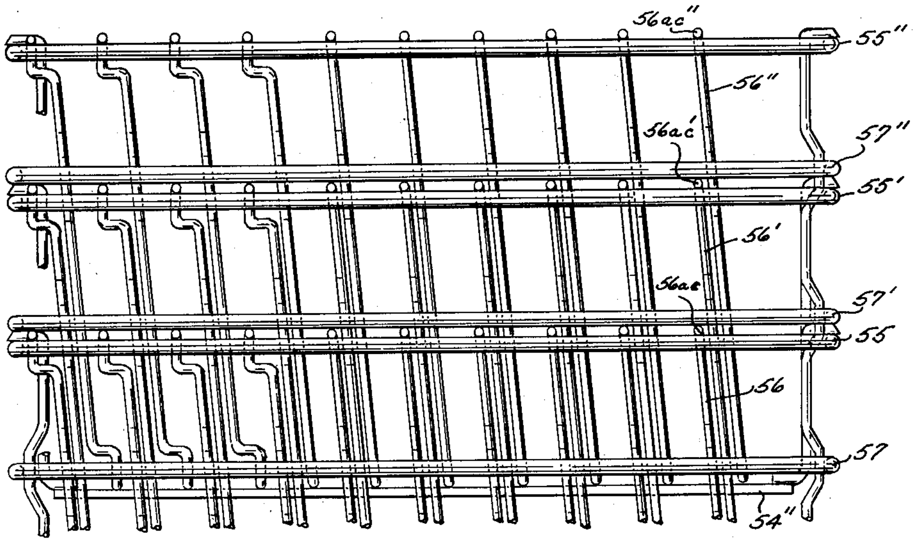
Figure 15:
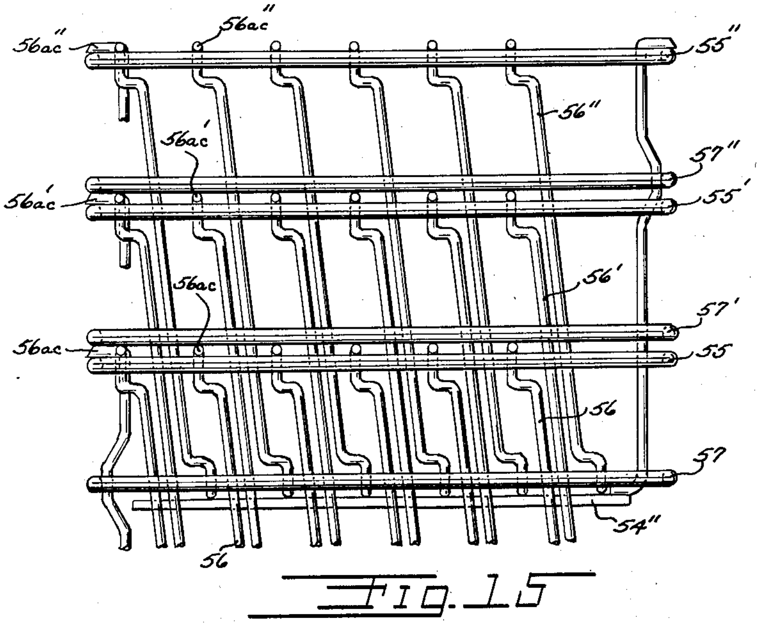

Figs. 5 to 15 show another modification of my invention where the tray or basket is made of separate wires and the basket is longer than it is wide. In the various views, Fig. 5 is a side elevational view of this tray, Fig. 6 is an end elevation thereof, Fig. 7 is a top plan view thereof, Fig. 8 is a fragmental side elevational view of portions of two trays according to Figs. 5, 6 and 7 placed together in tiered relationship, Fig. 9 is an end elevational view of portions of two tiered trays as in Fig. 8, Fig. 10 is a fragmental sectional view taken along the line 10—10 of Fig. 8 and showing all parts down to the plane of the line **10*a*** of Figs. 8 and 9, Fig. 11 is a fragmental sectional view similar to Fig. 10 but showing another position of the parts, Fig. 12 is a fragmental sectional view showing in perspective a corner of the tray of Figs. 5, 6 and 7 at the place where the wires of the upper tray rest upon the projections of wires of the lower tray to hold the two trays in nested relationship, Fig. 13 is a view similar to Fig. 12 but showing the upper tray rotated a few degrees toward the right from the position of Fig. 12 so as to permit the support portions near the bottom of the upper tray to clear and pass the tiering support portions near the top of the lower tray while proceeding with a nesting operation, Fig. 14 is a fragmental side elevational view of three of the trays of Figs. 5, 6 and 7 in nested relationship and Fig. 15 is a fragmental end elevational view of the same three trays in nested relationship.

Figure 16:
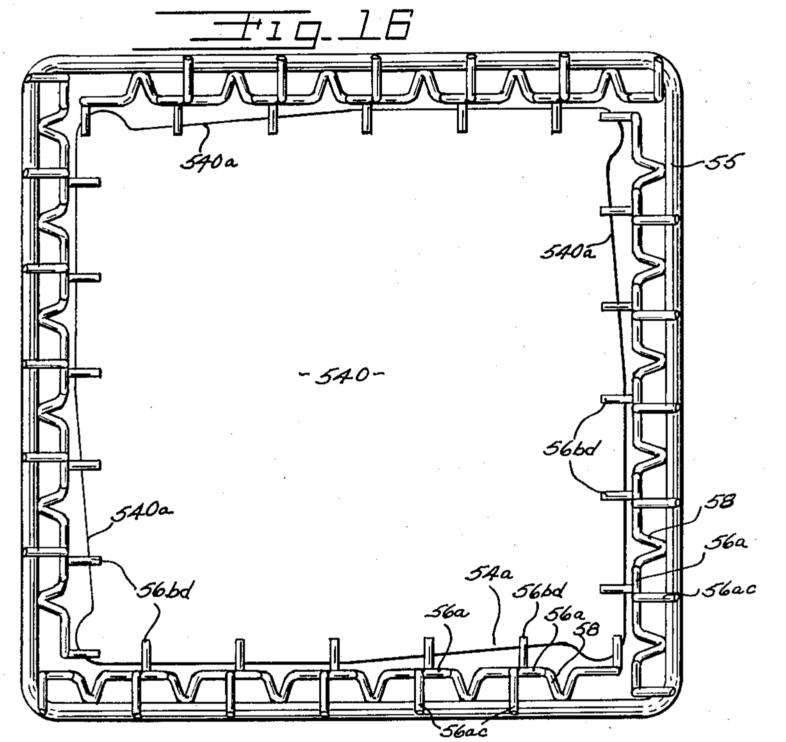
Figure 17:
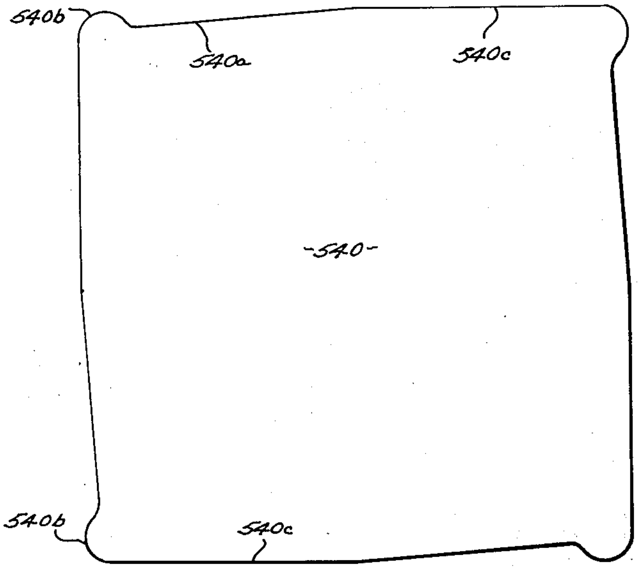
Figures 18, 19:
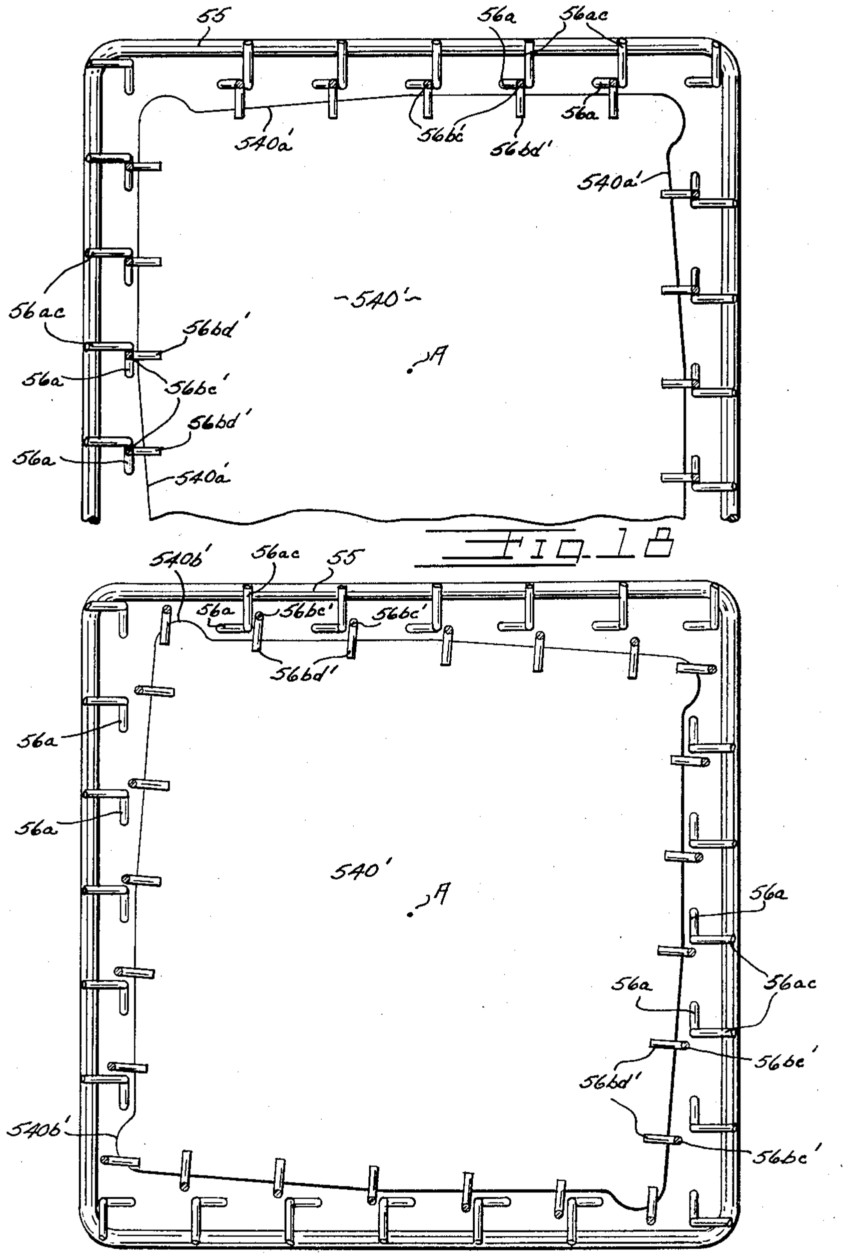

Figs. 16 through 19 show another form of my invention very similar to that shown in Figs. 5 through 15 except that the form of Figs. 16 through 19 is square in plan whereas the form in Figs. 5 to 15 is rectangular in plan. Fig. 16 is a top plan view of this embodiment, Fig. 17 is a plan view of the bottom of the tray of Fig. 16, Fig. 18 is a fragmental sectional view taken in the same manner as Fig. 10 and Fig. 19 is a view similar to Fig. 18 but showing another position of the parts analogous to the relationship between Figs. 10 and 11.

Figure 20:
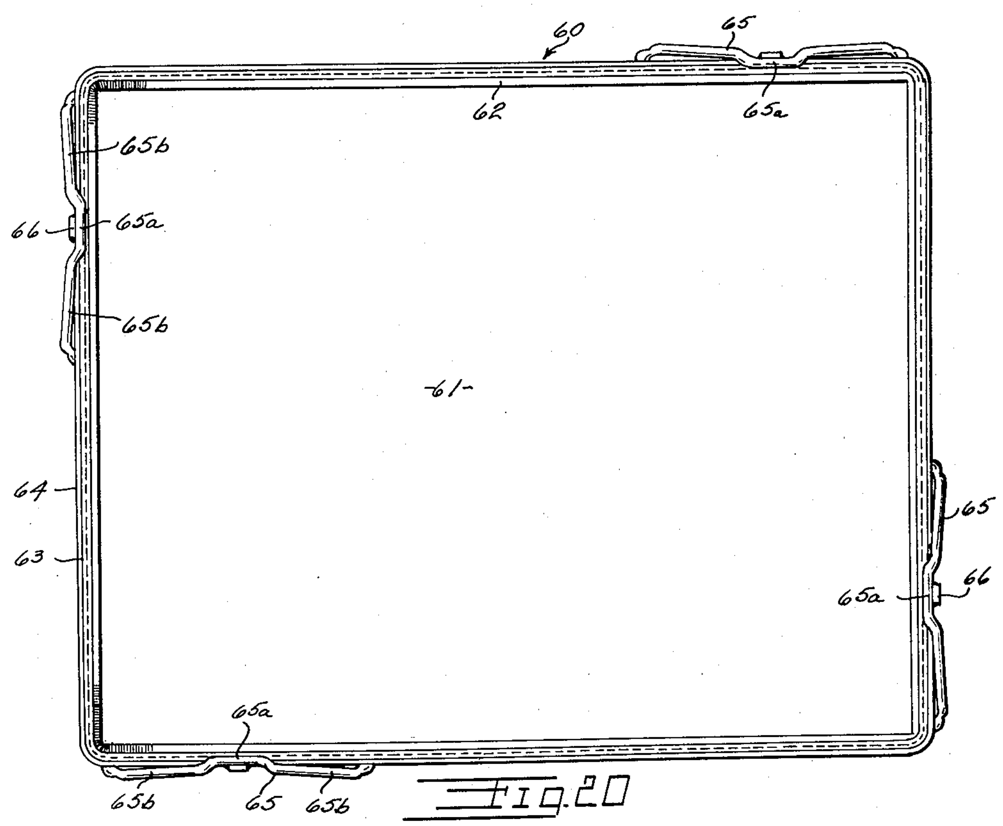
Figure 21:
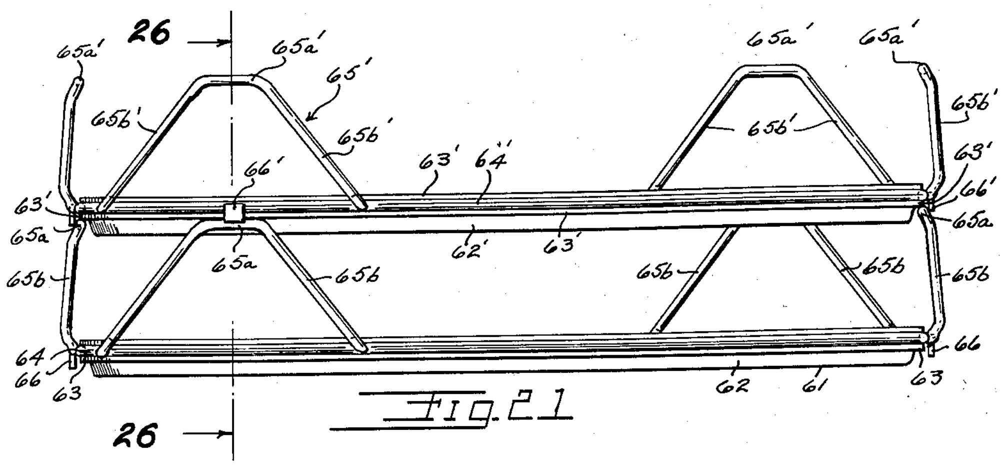
Figure 22:
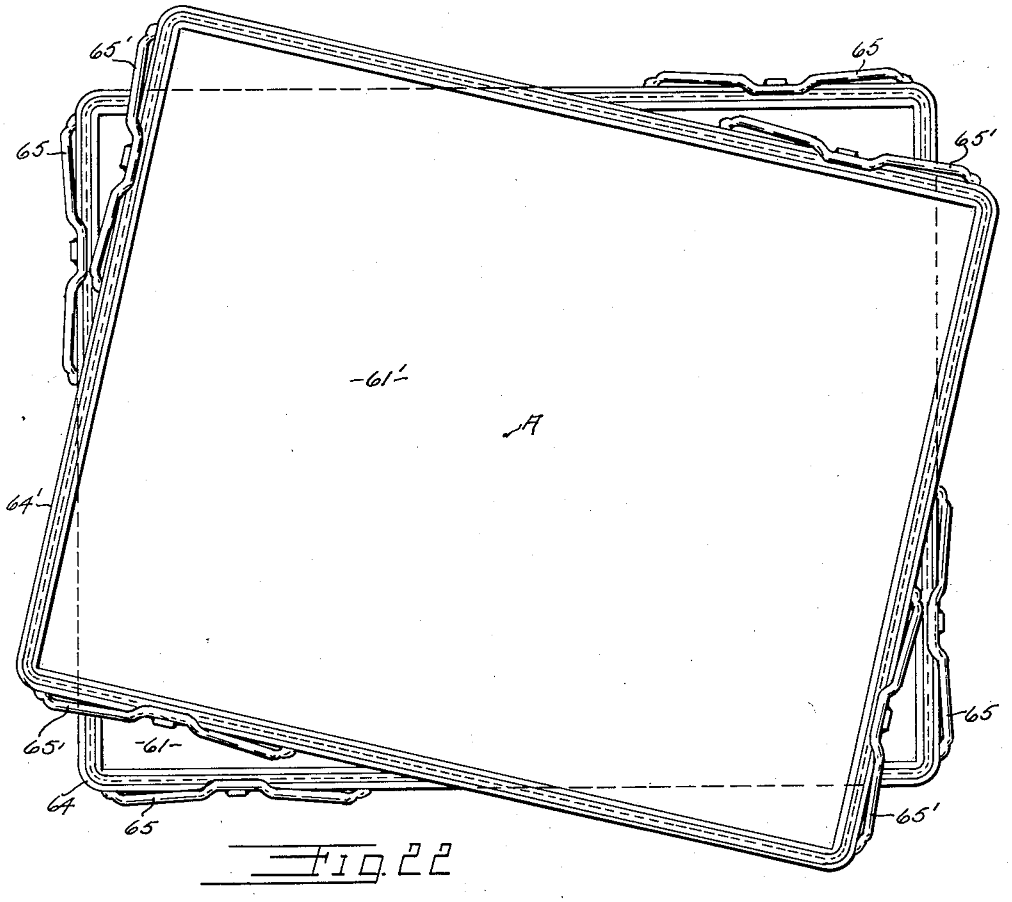
Figures 23, 24:
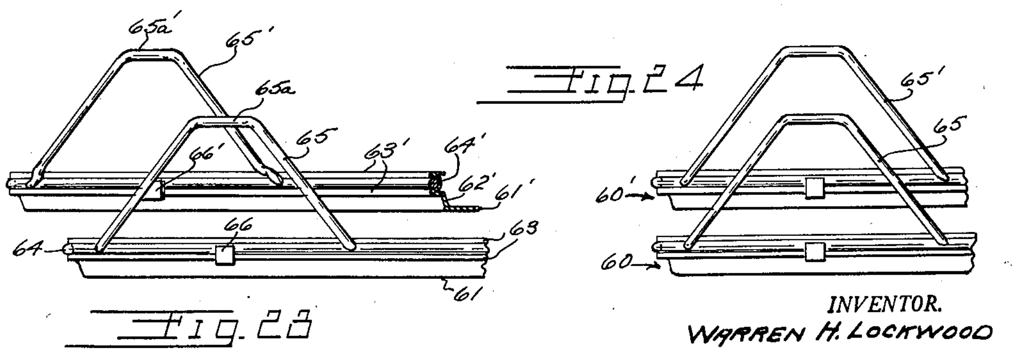
Figure 25:
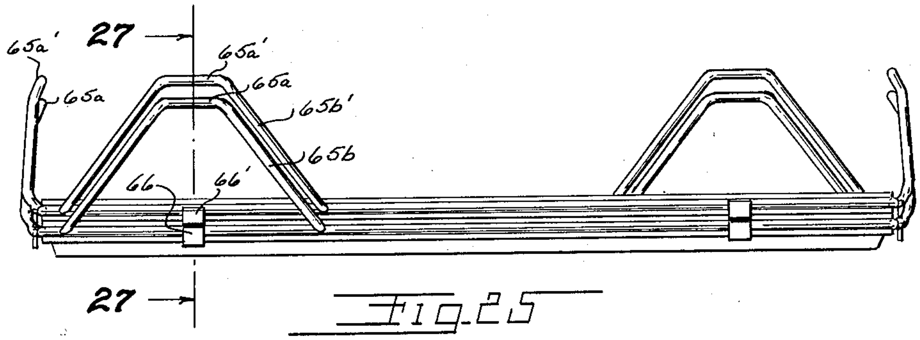
Figure 26:
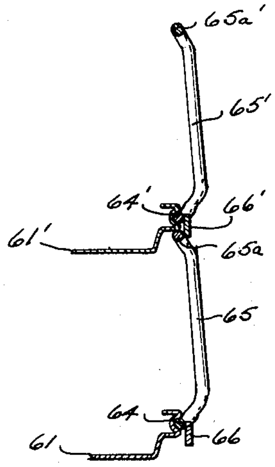
Figure 27:
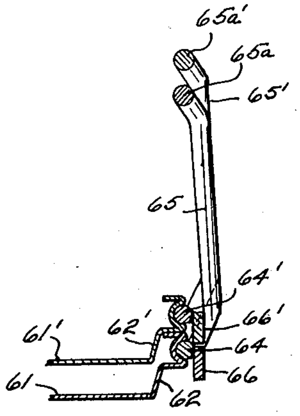

Figs. 20 through 27 show another embodiment of my invention comprising a flat tray with a very shallow rim around the edge thereof and with four widely spaced side portions located near the four corners of the rectangular tray. In these views, Fig. 20 is a top plan view of the tray, Fig. 21 is a side elevational view of two of the trays of Fig. 20 in tiered relationship, Fig. 22 is a top plan view of the two trays of Fig. 21 showing the upper one rotated a few degrees about a central vertical axis prior to a nesting operation, Fig. 23 is a fragmental side elevational view of the trays of Fig. 22 showing the position of the side portions or handles where the tiering support portions of the two trays clear each other vertically, Fig. 24 is a view similar to Fig. 23 but showing the trays brought back into vertical registration after the tiering support portions have passed each other in a nesting operation, Fig. 25 shows the two trays of Figs. 21 and 22 in completely nested relationship, Fig. 26 is an enlarged sectional view taken along the line 26—26 of Fig. 21 and Fig. 27 is an enlarged fragmental sectional view taken along the line 27—27 of Fig. 25.

Figure 28:
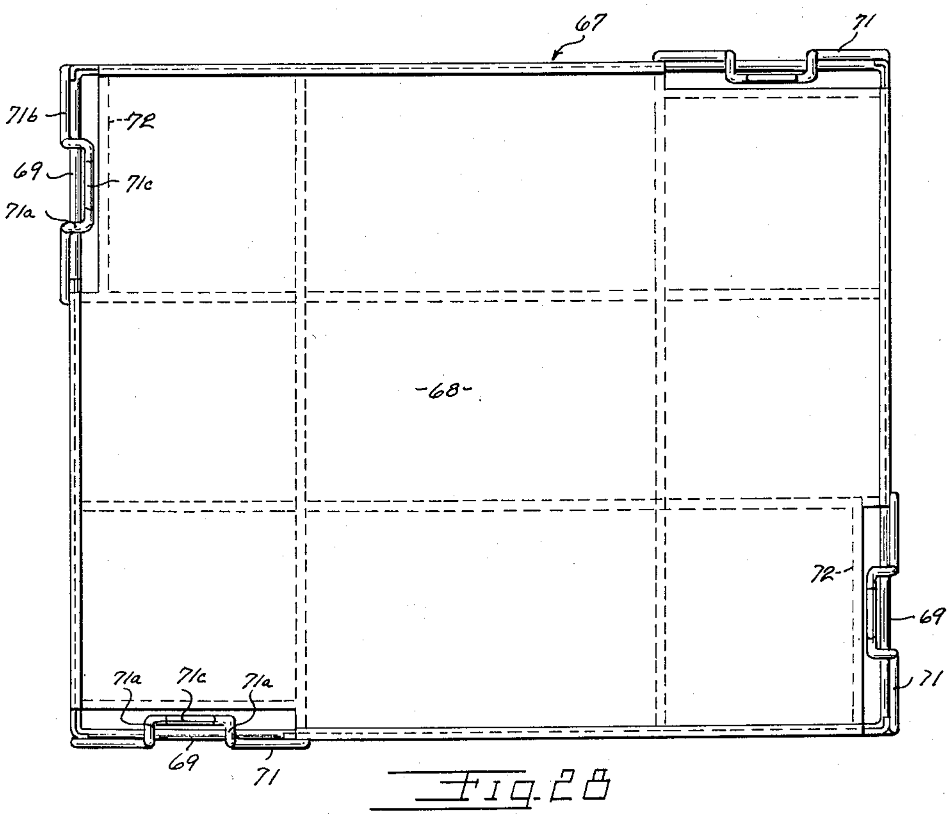
Figure 29:
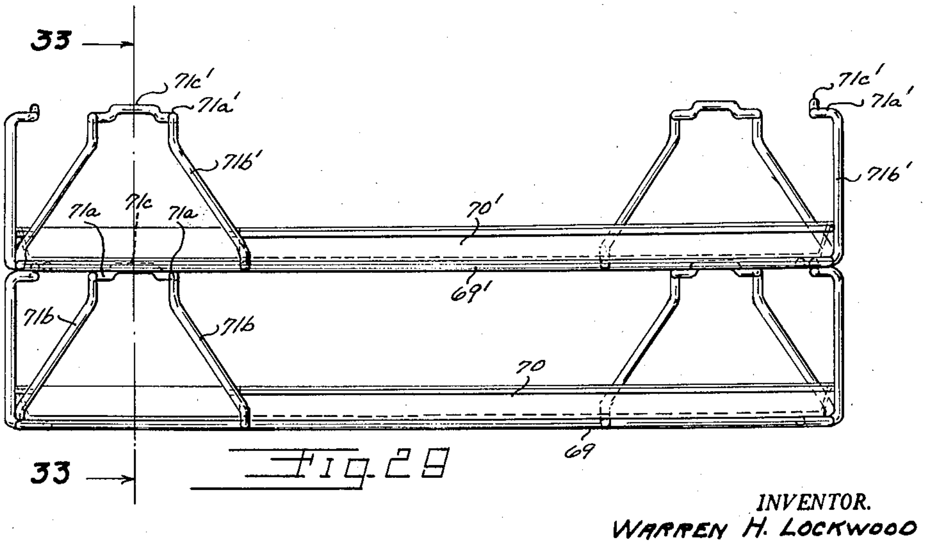
Figure 30:
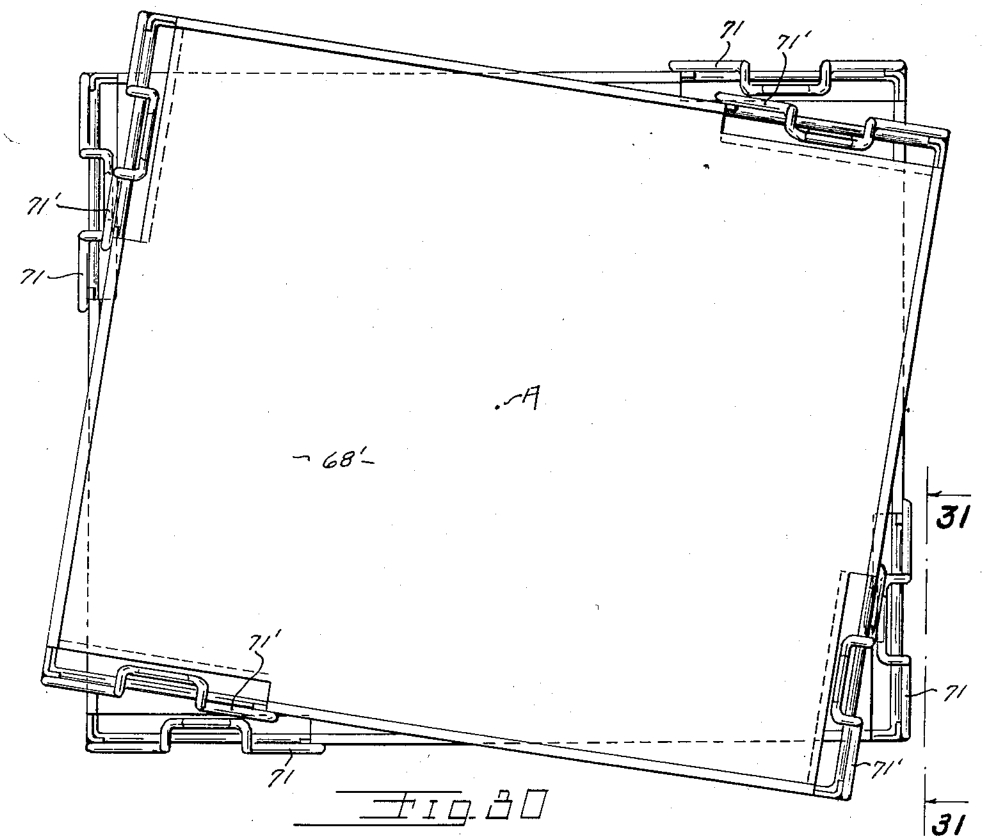
Figure 31:
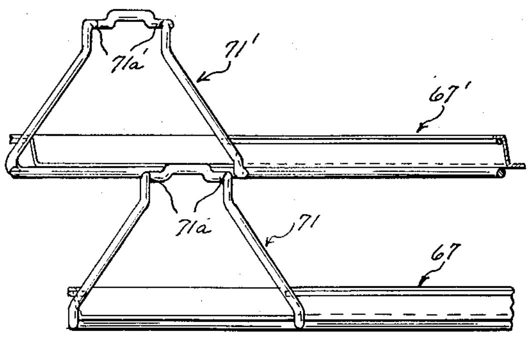
Figure 32:
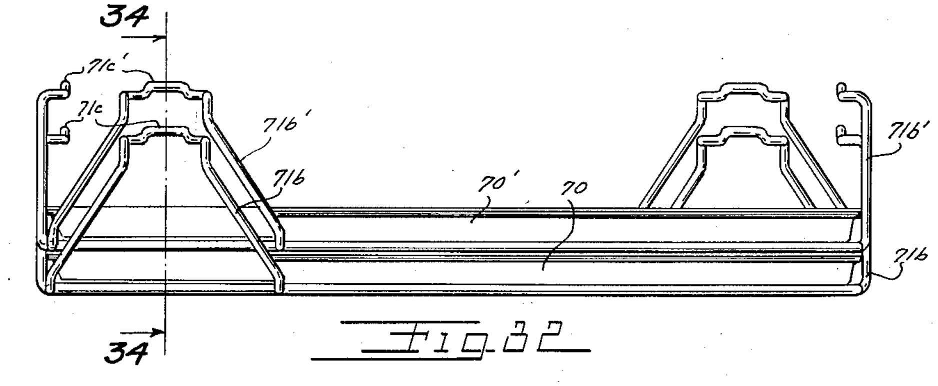
Figure 33:
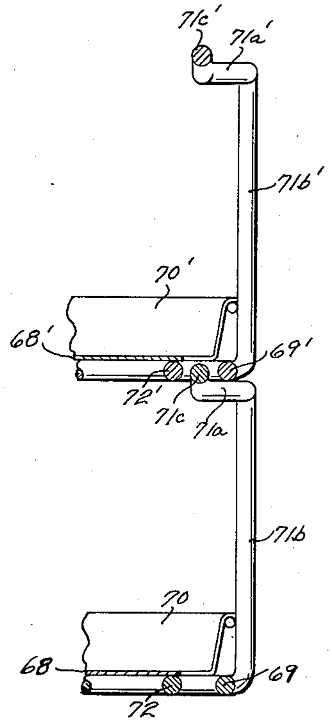
Figure 34:
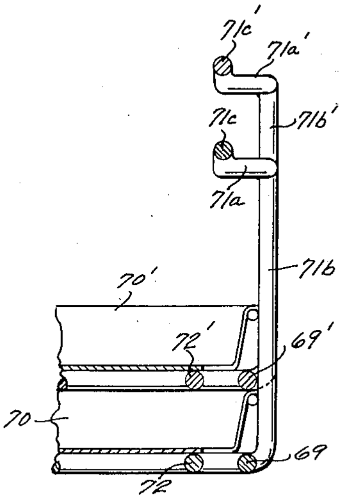

Figs. 28 through 34 show another modification of my invention comprising a generally flat tray with a very shallow edge or rim about the edge thereof and four widely separated side portions located near the corners of the rectangular tray. Fig. 28 is a top plan view of a tray of this embodiment, Fig. 29 is a side elevational view of two trays like that of Fig. 28 in tiered relationship, Fig. 30 shows the two trays of Fig. 29 with the upper one rotated slightly with reference to the lower one at the beginning of a nesting operation, Fig. 31 is a fragmental side elevational view of the two trays of Fig. 30 showing the position of the parts when the tiering support portions of the upper tray will clear and pass the other support portions of the lower tray, Fig. 32 shows the completely nested relationship of the two trays of Figs. 29 and 30, Fig. 33 is an enlarged fragmental sectional view taken along the line 33—33 of Fig. 29 and Fig. 34 is an enlarged fragmental sectional view taken along the line 34—34 of Fig. 32.

Figure 35:
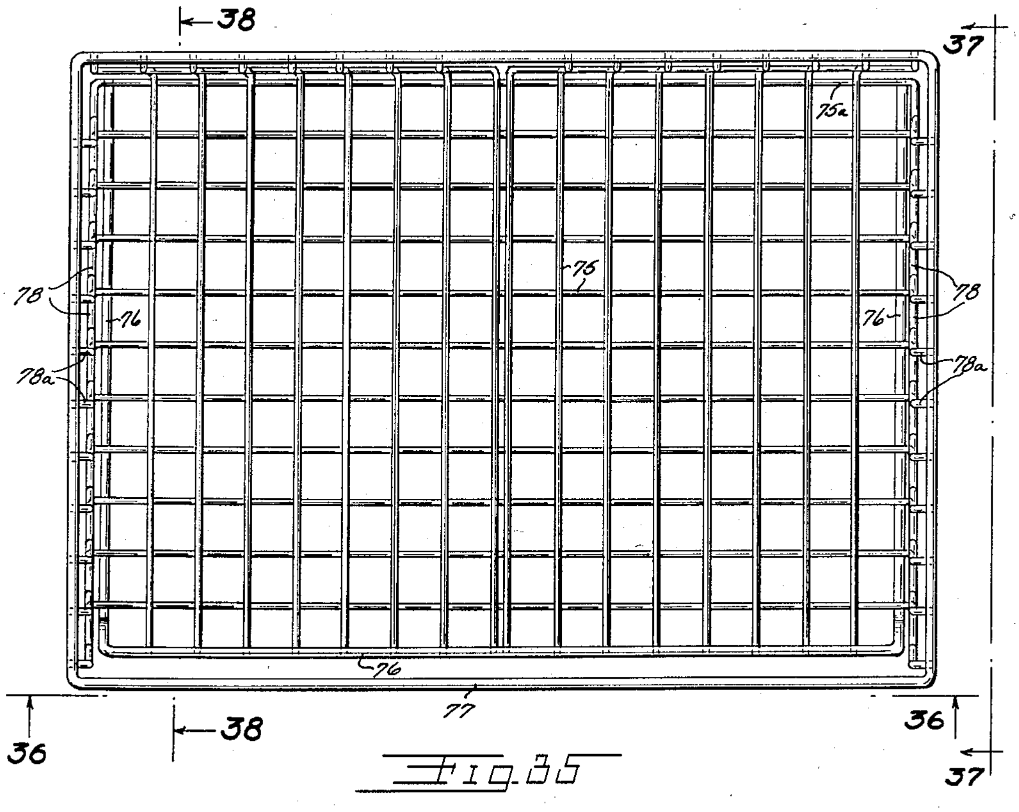
Figure 36:
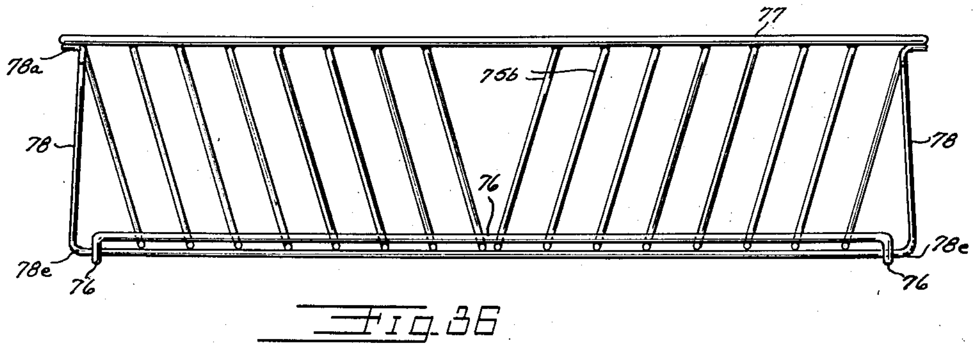
Figure 37:
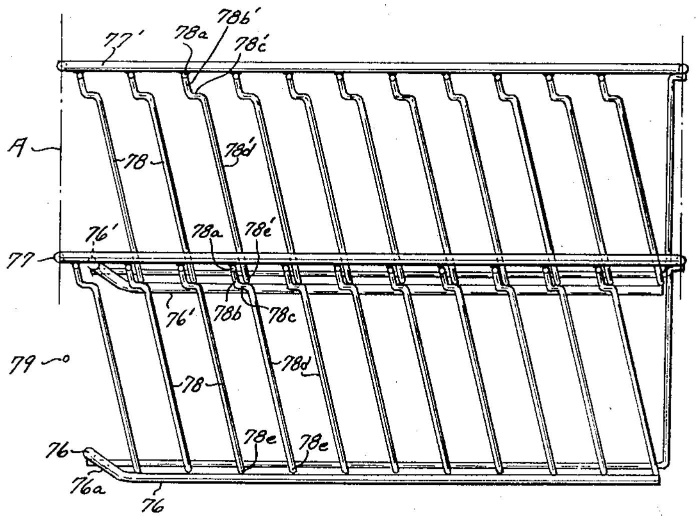
Figure 38:
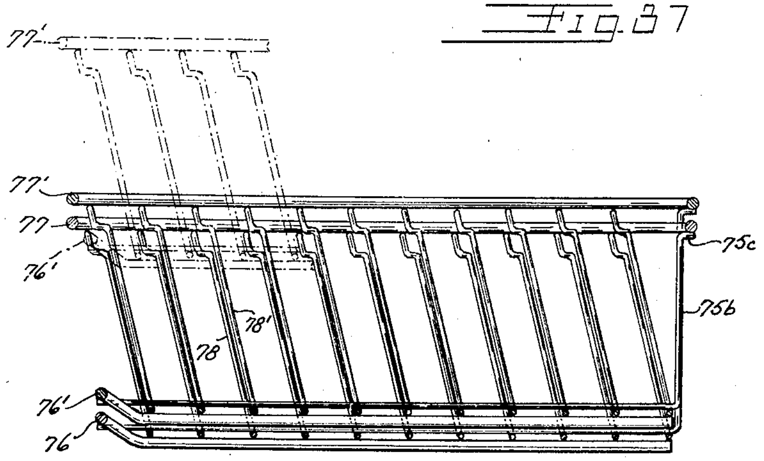
Figure 38:
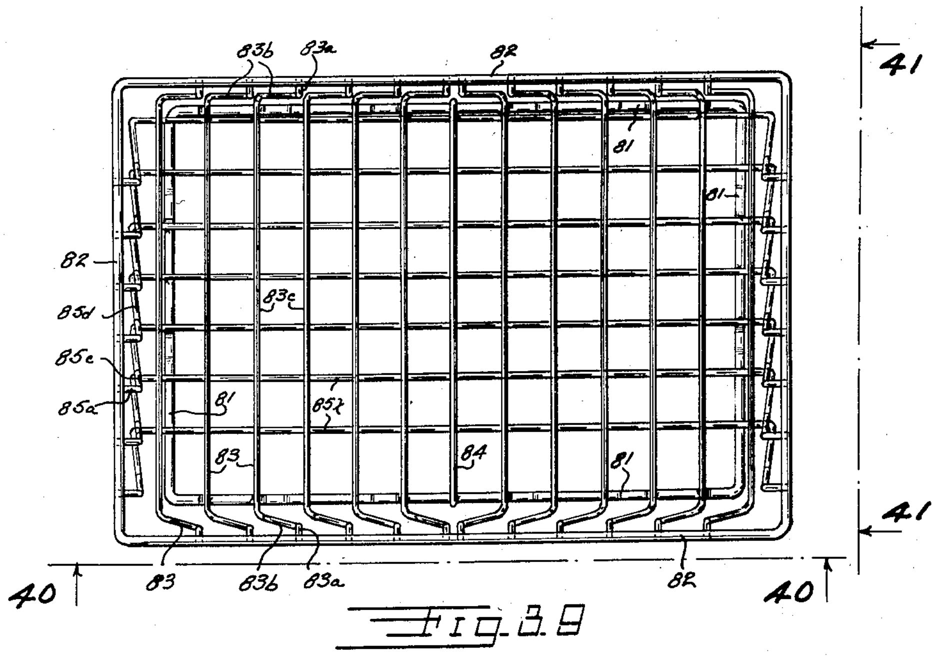

Figs. 35 through 38 show another modification of my invention where the upper tray is shifted in a linear direction to disengage the tiering support portions, after which a nesting action is possible. Fig. 35 is a top plan view of a tray embodying this invention. Fig. 36 is a front elevational view of the same taken from the position of the line 36—36 of Fig. 35. Fig. 37 is an end view of the tray of Fig. 35 taken from the position of line 37—37, together with a second tray in tiered relationship above the first. Fig. 38 is a view taken from the same position as Fig. 37 but showing in full lines the fully nested position of two trays and in dot-dash lines an intermediate position of the upper tray as it moves downwardly toward nested position.

Figure 40:
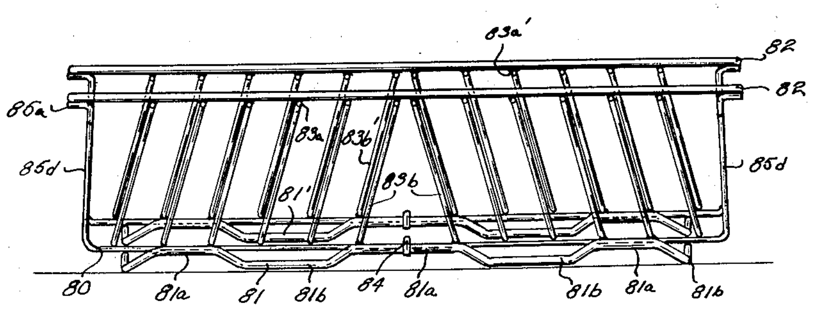
Figure 41:
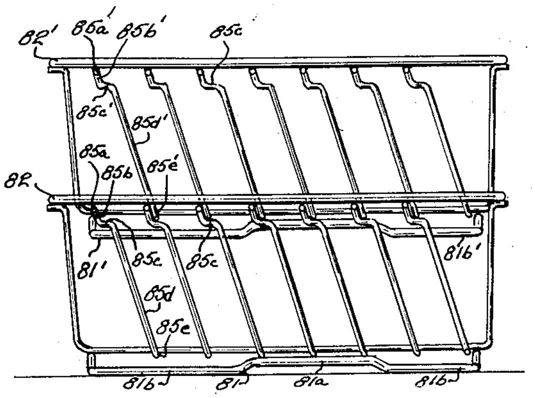

Figs. 39, 40 and 41 show still another embodiment of my invention closely related to the form mentioned above. Fig. 39 is a top plan view of a tray or basket embodying this invention. Fig. 40 is a front elevational view of the same taken from the position of the line 40—40 of Fig. 39 but showing two of the baskets in fully nested position. Fig. 41 is an end view of the basket of Fig. 39 taken from the position of the line 41—41 of Fig. 39 but with a second basket in tiered position above the first basket.

Figures 1, 2, 3, 4:
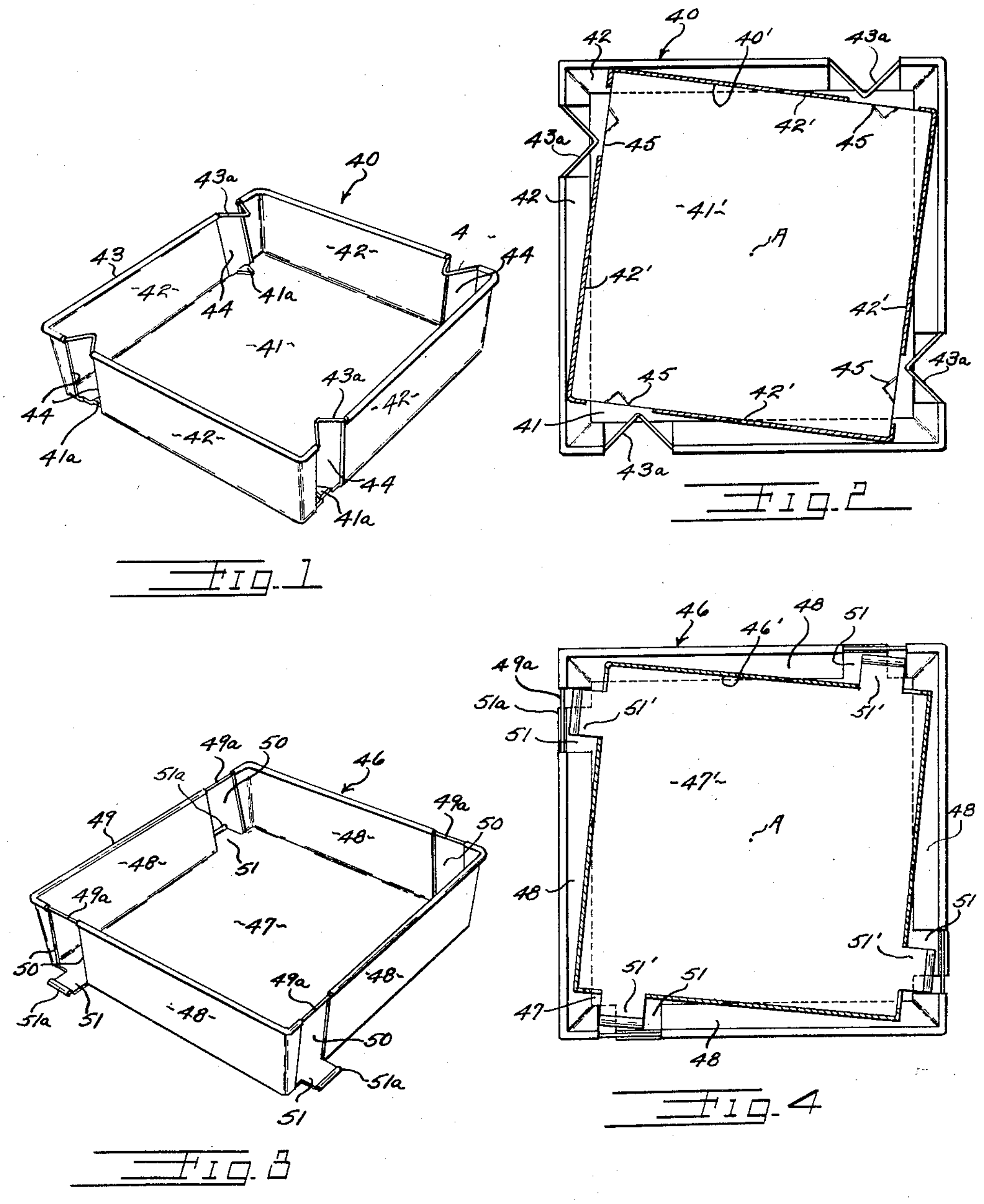

An easily understandable form of my invention is shown in Figs. 1 and 2. Here the tray 40 is generally square in plan view having a bottom 41 and four upstanding sides 42. Here the tray is made largely of sheet material such as sheet metal or plastic. However, in all forms of my invention disclosed herein, the material of which the trays are made is relatively unimportant as will be understood as the description of the invention proceeds. Here the upper edge portion defining means is a bead 43 formed by a continuous wire extending around the upper edge of the tray over which the side wall material of the members 42 is folded except at four open spaces **43*a*. In this form of my invention, the members 42 provide frame members sloping upwardly and outwardly from the bottom 41 to connect with the upper edge portion defining means. In other forms of the invention hereinafter described, these frame members are not always sheet metal but may be made of wire or other separate members. The portions 43*a* provide a plurality of tiering support portions extending inwardly from the upper edge of the tray and near the four corners thereof. There is a vertically extending clearway 44 which here consists of an opening in each side portion 42 and extending from the tiering support portion 43*a* down substantially to the bottom 41. There will be noted a slightly indented triangular recess 41*a* up set from beneath the bottom 41 and directly below each wire portion 43*a* for the purpose of receiving the wire portions 43*a*** when two like trays are placed in tiering position.

Referring to Fig. 2, I have shown the lower part of an upper tray 40′ exactly like that described in connection with Fig. 1 which is being moved from a tiering position with respect to the lower tray so as to pass the upper tray downwardly into the lower tray for nesting purposes. It will be noted that the bottom 41′ will pass into the upper part of the lower tray because of the sloping walls or frame members 42 of the lower tray. It will be noted that the upper tray has been turned a few degrees (between 7 and 8 degrees) about a generally central vertical axis A and the parts are so proportioned as to permit this as the lower part of the upper tray moves down into the upper part of the lower tray. This rotative movement is sufficient to permit the support portions at 45 on the bottom 41′ to clear the tiering support portions **43*a* of the lower tray so that the upper tray may pass downwardly into the lower tray. After the upper tray is passed downwardly with the parts in the position of Fig. 2, the upper tray may be rotated back in a counterclockwise direction as viewed in Fig. 2 whereupon the upper tray will move downwardly in the lower tray to a completely nested position with the bottom 41′ almost touching the bottom 41**.

Thus, two trays identical with that shown in Fig. 1 may be placed in tiering position when the trays are filled with material, or the two trays may be placed in a closely nested position to save space when the trays are being stored or returned to a place of filling. This is all done without any moving parts being supplied whatsoever.

Another simple form of my invention is shown in Figs. 3 and 4. Here the tray 46 has a bottom 47 having four upwardly and outwardly extending side wall portions 48. The upper edges of the side walls are folded in a bead around a continuous wire to form the bead 49 except at four spaced portions **49*a* where the wire is left exposed. Vertically beneath each bare wire support portion 49*a* is a tiering support portion 51 in the form of a tongue projecting laterally outwardly from the bottom 47. Preferably, the distal end of each tongue is bent to form a downwardly extending groove or recess at 51*a* the arrangement being such that the groove 51*a* is directly vertically below the associated bare wire support portion 49*a***.

In Fig. 4, the lower part 46′ of an upper tray exactly like 46 is shown in section as being entered downwardly into the lower tray 46 after a tiering operation. In such a tiering operation, each of the grooves **51*a* fits over one of the bare wire support portions 49*a* so as to hold the upper tray tiered on the lower tray and the grooves 51*a* prevent lateral displacement of the upper tray relative to the lower tray. In order to start a nesting operation, the upper tray is rotated a few degrees about a generally vertical central axis A so as to cause the tiering support portions 51′ of the upper tray to clear the support portions 49*a* of the lower tray as clearly shown in Fig. 4. The clearways 50 then permit the tiering support portions 51′ to pass downwardly in the position of Fig. 4 until the parts 51′ have cleared the support portions 49*a*. Then, the upper tray may be rotated in a counterclockwise direction from the position of Fig. 4 until the two trays are again vertically aligned after which the upper tray may be moved down to a fully nested position where the bottom 47′ of the upper tray almost touches the bottom 47** of the lower tray so as to greatly reduce the space occupied by two trays in their nested position.

It will be noted in Fig. 4, that the clearways 50 are wider as measured along a side of the tray than the width of a tiering support portion 51' so as to permit the tiering support portion 51' to move angularly into the clearway 50 as shown in Fig. 4 to accommodate the passing and nesting action.

In Figs. 5 to 15 inclusive, I have shown still another embodiment of my invention. Of this embodiment, Fig. 5 shows a side elevational view, Fig. 6 an end elevational view and Fig. 7 a top plan view. This tray is generally rectangular in plan as apparent from Fig. 7 in distinction to the next described modification which is substantially square in plan. Referring first to Fig. 6 and Fig. 7, the tray 52 has a bottom 54 with a substantially planar bottom edge portion **54*a*. The means defining an upper edge portion is a heavy wire 55 extending completely around the upper edge of the tray generally in a plane parallel to and spaced above the bottom edge portion 54*a*. Here the means defining the upper edge portion comprises horizontally spaced side portions which are the four generally vertically extending side walls of the tray or basket 52. The frame members which rigidly connect the bottom and upper edge portions are the wires of smaller diameter 56**.

In this form of my invention, the tiering support portions extend generally parallel to the sides of the basket or tray 52. Since a rotative movement of an upper tray relative to a lower tray is utilized to provide nesting, the arrangement of the tiering support portions **56*a* could better be described with reference to the central vertical axis A about which this rotative movement occurs. With this in mind, it will be noted that the tiering support portions extend at an angle close to 90 degrees with respect to a radius extending between each support portion and this central vertical axis. The tiering support portions 56*a* are near the upper edge of the tray. The other support portions which coact with the tiering support portions to hold two baskets in tiered relationship are near the bottom of the basket and are shown at 56*b* in Figs. 5 and 6. It will be noted that the upwardly extending frame members 56 which rigidly connect the bottom 54 and the upper edge portion defining means 55 slope upwardly from the bottom in manner facilitating nesting of two like trays. This sloping or inclination of the frame members 56 in this form of my invention is downwardly from the top toward the right-hand around the entire tray or basket. It will be borne in mind that the frame members 56 sloping downwardly and toward the right are on the near side of the basket while the frame members on the opposite side appear from this position to slope the other way, but of course when viewed from the other side of the basket also slope downwardly and toward the right-hand. It will be noted in Fig. 6 that the tiering support portions 56*a* and the other support portions 56*b* are shown at the upper and lower ends of each of the frame members 56. This is at the narrower dimension at the end of the basket. In Fig. 5, it will be noted that only the four left-hand frame members 56 are provided with tiering support portions 56*a* and only the three left-hand members are provided with the other support portions 56*b*.** The same is true at the other side of the basket which appears in elevation exactly like the near side of the basket in Fig. 5. The purpose of this arrangement on the longer side of the basket will be apparent hereinafter.

It will be noted in the various views that the plane passing through the frame members 56 on any one side of the tray or basket is generally vertical with the upper edge portion 55 lying outside the plane and with another heavy wire member 57 extending entirely around the tray a slight distance below the top and forming a nesting stop member as will later appear. Outwardly offset portions 58 of the wire members 56 support the wire or rod 57 which is in a position directly vertically below the member 55.

The structure immediately adjacent the support portions **56*a* and 56*b* will be readily understood from Fig. 12. This view shows the lower part of an upper basket or tray adjacent the upper part of a lower basket or tray. The parts connected with the upper basket or tray are given the suffix prime but otherwise carry the designations already mentioned with respect to Figs. 5, 6 and 7. It will be noted that the wire 56 which is provided with the tiering support portion 56*a* near its upper end, thereafter continues upwardly with a short vertical stretch 56*ab*, which thereafter turns horizontally outwardly at right angles to the side of the tray with a short portion 56*ac* which is secured to the wire 55** by soldering or welding. It should be understood that all of the wires and tray elements shown in Figs. 5 through 15 inclusive are welded or soldered to those other elements which they engage.

Referring back to Fig. 12, following one of the wires 56' of the upper tray downwardly past the support portion **56*b*', it will be noted that there is a short vertical portion thereafter 56*bc*' followed by a short horizontal portion extending laterally inwardly 56*bd*' which is secured to the bottom 54' as by soldering or welding. When the upper tray or basket rests in tiered position upon the lower tray or basket, as shown fragmentally in Fig. 12, the load of the upper tray may be carried by the members 56*bd*' resting on the members 56*a*, or by the member 56*b*' resting on the members 56*ac*,** depending upon how the parts are made. It is possible if the parts are very accurately made to have the load absorbed at both of these points simultaneously.

When the parts are to be moved from the position of Figs. 8, 9 and 12 where an upper tray is tiered upon a lower tray, in order to start the nesting operation of the upper tray down into the lower tray, the upper tray is lifted slightly while the parts are in the position of Fig. 10, then rotated slightly relative to each other about a vertical central axis A to the position shown in Fig. 11. The position of the parts in Fig. 10 is also seen in Figs. 8, 9 and 12. The position of the parts in Fig. 11 is also shown in Fig. 13. In order to permit the slight rotation of the upper tray relative to the lower tray as indicated in Figs. 11 and 13, the bottom 54 as seen in Fig. 7 or 54' as seen in Figs. 10 and 11, is cut away from the true rectangular form. As viewed from above, the left-hand portion of each side of the bottom, to the left of a center line, slopes away from the center line and downwardly toward the corner along an angle roughly equivalent to the angle of rotation B indicated in Fig. 11. This permits the rotation of the parts from the position of Fig. 10 to the position of Fig. 11 while the bottom 54' of the upper tray is still inside of the upper part of the lower tray. The rotated position of the parts causes the tiering support portions near the bottom of the upper tray to clear the coacting tiering support portions near the top of the lower tray when the parts are in the position of Figs. 11 and 13 as will clearly appear. It will have been noted that all of the wires 56 at the end of the basket or tray are provided with these tiering support portions as clearly seen in Fig. 6. It will be recalled that in connection with Fig. 5 it was explained that only a few of the wires 56 toward the left-hand side of the longer sides of the tray are provided with these tiering support portions. Reference to Figs. 11 and 13 will show the reason for this. As viewed in Fig. 11, the three wires **56*bc*' shown at the upper right-hand corner of the bottom 54' are carried by the rotation of the upper tray toward the right and away from the coacting parts 56*a*, 56*ab* and 56*ac* of the adjacent wires 56 of the lower tray which just coacted previously in the tiering action shown in connection with Figs. 10 and 12. A continuation of this structure toward the left along the upper side of bottom 54'** as viewed in Fig. 11 would result in a jamming of the parts rather than a clearing of the parts. This is because the wires 56′ nearer the center A do not have sufficient radial movement to provide the clearing action, while the wires 56′ viewed toward the left upper side of the bottom 54′, as viewed in Fig. 11, are moved toward the adjacent side of the lower basket rather than away from it. It will be noted that the same clearing action takes place at the lower left-hand corner of the parts as viewed in Fig. 11 and at each of the shorter ends of the basket or tray.

Figs. 5 and 6 make it apparent that clearways are provided beneath each of the tiering support portions 56*a* vertically downwardly so that after the parts have cleared each other in the position of Figs. 11 and 13, there is no obstruction to passing the upper tray downwardly into the lower tray until the two trays are completely nested. Such a completely nested position of three trays is shown in Figs. 14 and 15 where Fig. 14 is a side elevational view and Fig. 15 an end elevational view. The parts of the lowermost basket are indicated without any suffix, of the next higher basket with a prime suffix, and of the second higher basket with the double prime suffix. It will be noted that the second tray moves downwardly into the first tray until the nesting stop ring 57′ of the upper tray rests on the wire parts 56*ac* of the lower tray which prevents the wire members 56′ of the upper tray jamming the wires 56 of the lower tray which are generally parallel to each other. In like manner, the third tray moves down into the second tray until the ring 57″ of the top tray rests on the wire ends 56*ac*′ of the basket immediately beneath it. It is clearly apparent in Figs. 14 and 15 that three of these trays when nested occupy only about 66 percent more space than the height of a single tray.

The embodiment shown in Figs. 16 through 19 inclusive is quite similar to that just described except that the basket or tray is square in plan view rather than rectangular. A top plan view of this tray is shown in Fig. 16 and each side elevational view around the four sides of this tray would be identical with Fig. 6. There is, therefore, no necessity for further description of the construction of the basket or tray of Figs. 16 through 19 and the parts have been given numbers exactly like those in Fig. 6, except that the bottom has been given the reference character 540 instead of 54.

Referring now to Figs. 6 and 16, each wire 56 entirely around the tray is bent in the same manner to provide the tiering support portions 56*a*, 56*ab*, and 56*ac* at the top of the basket or tray with all of the portions 56*ac* being soldered to the top rim or ring 55. At the lower end of each wire other support portions are provided at 56*b*, 56*bc* and 56*bd* with the latter members all being secured to the bottom 540. About a third of the way down from the top, each wire 56 is bent outwardly at 58 and there secured to a nesting stop ring 57. It will be noted that all of the wires 56 slope upwardly from the bottom and toward the left-hand entirely around the tray. It will be understood that they could equally well slope toward the right-hand. However, in any particular tray they must all slope in the same direction or toward one hand.

Referring now to Figs. 18 and 19, the view of Fig. 18 taken in a plane similar to the line 10—10 of Fig. 9, shows a fragment of the upper tray or basket, where the reference characters all have a prime suffix, resting upon the upper part of a lower tray or basket in tiering position. Here the support portions near the bottom of the upper tray rest upon the tiering support portions near the top of the lower tray as these support portions were mentioned hereinabove. To start a nesting operation, the upper tray is rotated a few degrees in Fig. 19 from the position shown in Fig. 18 about a central vertical axis A. This is done by lifting the bottom 540*a* slightly, then rotating toward the right as viewed in Fig. 19 until the support portions near the bottom of the upper tray clear the tiering support portions near the top of the lower tray in the position of the parts shown in Fig. 19. The spaces between the wires 56 provide clearways below the tiering support portions 56*a* so that after the parts have passed these tiering support portions near the upper rim of the lower tray, the upper tray may then be passed downwardly in the lower tray until the two trays meet in a nesting position when the ring 55′ of the upper tray rests upon the portions 56*ac* of the lower tray. In other words, the ring 57′ of the upper tray will substantially contact the ring 55 of the lower tray. It will be noted that the bottom 540 or 540′ has been cut away at 540*a* analogous to the structure already described at 54*a* and for the same purpose, namely, to permit the slight rotation of the bottom from the position of Fig. 18 to the position of Fig. 19.

A further modification of the bottom may or may not be incorporated in this tray as indicated at 540*b* or 540*b*′ at each corner of the bottom 540 or 540′. These are bumps or projections which extend outwardly to a point approximately in line with the flat portions 540*c* of the bottom where the bottom retains its original square formation. It will be noted in Fig. 6 that the basket is rather open at the corners. The purpose of the projections 540*b* is to protect articles stored in the basket or tray near the corners if the bottom of the tray bumps up against something else. It will be understood that the bottoms of these trays may take any desired form, in fact may be made of open wire structure as the sides are. In such a case, a wire of about the same diameter as 55 runs around the bottom in the configuration of 540 and the projections 540*b* in such a wire near the corner also strengthens the corners.

Another form my invention may take is shown in Figs. 20 through 27 inclusive. In this embodiment, the tray 60 has a bottom 61 surrounded by a shallow rim 62 which terminates near its upper edge in a double parallel flange 63. Secured between the flanges 63 and extending entirely or substantially entirely around the periphery of the tray is a heavy wire rod 64 which gives a strong hold on the tray entirely around its periphery for purposes of lifting as will later appear. The means defining an upper edge portion lying generally in a plane parallel to and spaced above the bottom edge portion or rim, here comprises four generally inverted V-shape handle-like members 65, here shown as positioned one on each of the four sides of the tray and near the left-hand end of the side as viewed in elevation. The actual means defining the upper portion are the slightly hook-like parts 65*a* at the top of each handle member. As clearly shown in Figs. 20 and 21, these portions 65*a* are bent inwardly slightly so as to lie directly above a portion of the flange 63 so that in a tiering position, as shown in Fig. 21, each member 65*a* of the lower tray forms a tiering support portion which engages a part of the flange 63′ of the tray above it so that the upper tray is supported at four spaced points around the periphery thereof. Here the upwardly extending frame members rigidly connecting the bottom and the upper edge portion defining means are the sloping sides 65*b* of each handle member 65. The lower ends of the frame members 65*b* are secured by welding or soldering to the heavy wire 64 of the tray. It will be noted that these frame members 65*b* slope upwardly and toward each other from the bottom of the tray and toward the upper edge defining portion 65*a* so that when two trays are nested as shown in Fig. 25, the inclined parts of the members 65 contribute to the close nesting of two or more trays. It will be noted that there is clearway directly beneath the tiering support portion 65*a* down to the final nesting position of an upper tray in a lower tray.

With the parts in the tiering position of Fig. 21, the operator grasps two handles of the uppermost tray, preferably the two at the opposite ends thereof and rotates the upper tray (parts designated by the prime suffix) a few degrees relative to the lower tray about a central vertical axis A. This is the position of the parts shown in Figs. 22 and 23. In this position of the parts, the handle member 65' of the upper tray clears the handle 65 of the lower tray so that the upper tray may be rotated back to the position shown in Fig. 24 where the upper tray is in vertical registry above the lower tray. With the parts in the position of Fig. 24, the operator may then lower the upper tray toward the lower tray to the fully nested position of Fig. 25. The sloping sides **65*b* and 65*b'*** of the handle portions of the respective trays permit this close nesting action of the two trays. This final nested position is shown in greater detail in the fragmental sectional view of Fig. 27.

Means is provided to prevent lateral displacement of the upper tray with respect to the lower tray when in the tiered position of Figs. 21 and 26. To this end, a tongue or tab 66 is provided rigidly secured as by welding to the rod 64 of the tray and extending downwardly therefrom directly beneath the tiering support portion **65*a*. Then, when the parts are in the tiered position in Figs. 21 and 26, the tab 66' of the upper tray lies laterally outside of the tiering support portion 65*a* of the tray beneath it. Since there are four of these tabs around the periphery of the tray, one under each handle member 65 or 65'**, these tabs prevent lateral displacement of the upper tray with respect to the lower tray in any direction.

The form of my invention shown in Figs. 28 to 34 inclusive is somewhat similar to that just described. Each tray 67 has a bottom 68 generally planar in form and shown as surrounded by a heavy wire member 69 extending entirely around the periphery. Preferably, but not necessarily, a shallow rim 70 extends around the major portion of the periphery of each tray. Here, the means defining the upper edge portion of the tray comprises the upper portion **71*a* of each of four handle-like members 71 secured one to each of the sides of the rectangular tray and preferably near the corner at the same hand on each side of the tray, for instance, in the drawings, each of the handle-like members 71 is at the left-hand end of a side of the tray when viewed in elevation. The frame members rigidly connecting the bottom edge portion and the upper edge defining portions of this tray are the slanting members 71*b* of the handle-like members 71. These slope upwardly from the bottom of the tray and toward each other to facilitate nesting as will later appear. As clearly seen in Fig. 33, the portions 71*a* which form the tiering support portions connected with each handle member 71 are the inwardly horizontally extending portions at the upper ends of the members 71*b*. There are two of these tiering support portions 71*a* connected with each of the handle members as I have clearly indicated in the various views. In the tiering position of Fig. 33, the bar 69' around the bottom of the upper tray forms a support portion which engages the tiering support portions 71*a* directly beneath it when the two trays are in vertical registration. Since this support is provided near each of the four corners of the rectangular tray, the tray is firmly supported with one on top of the other. The two tiering support portions 71*a* of each handle are connected together by an intermediate part 71*c*** for a purpose later described.

With the parts in the tiered position of Figs. 29 and 33, the operator grasps two of the handles 71' of the upper tray and rotates the upper tray through a few degrees relative to the lower tray about a central vertical axis A as shown in Fig. 30. In this position of the parts, shown in plan view in Fig. 30 and in fragmental elevational view in Fig. 31, the support portions of the upper tray will clear and pass the support portions of the lower tray, and since there is a clearway extending vertically downward from the tiering support portions **71*a*, as clearly seen in Figs. 33 and 34, the upper tray may be returned to the registration position above the lower tray and the trays move to a final nesting position as shown in Figs. 32 and 34. The sloping sides 71*b* and 71*b'*** of the frame members of the two trays permit this nesting action.

In this form of my invention, means is also provided to prevent lateral displacement of the upper tray relative to the lower tray when in tiered position. This is most clearly seen from Fig. 33. An additional bar 72 or 72' is provided rigid in the bottom of the tray parallel to the frame bar 69 or 69' for a distance approximately equal laterally to the width of each handle member 71 or 71'. The spacing between the bar 72 and the bar 69 is slightly wider than the thickness of the member **71*c* previously mentioned. Referring to the central portion of Fig. 33, it will be seen that if the upper tray tries to move toward the left, the bar 69' will strike against the projection 71*c*. On the other hand, if the upper tray tries to move toward the right, then the bar 72' will strike the projection 71*c*. Therefore, there is a double provision here against movement of the upper tray either direction laterally with respect to the lower tray. Of course, this is repeated at the four corners of the tray 67**.

It will therefore be seen that in all forms of my invention above described, coacting supports are provided for engagement between the lower part of an upper tray and the upper part of a lower tray for tiering action, and in every instance a nesting operation may be produced by simply rotating the upper tray a few degrees relative to the lower tray about a central vertical axis and thereafter the two trays may be moved one inside the other to a completely nested position. All of this is accomplished in each form of the invention described without any moving parts whatsoever.

In that form of my invention shown in Figs. 35 through 38, the invention is shown as applied to a generally rectangular tray or basket having a generally planar bottom comprised of parallel crossing wires as indicated at 75, although it will be understood that this bottom might take any desired form, for instance, it could be a flat sheet of continuous material. The bottom edge defining portion is herein a heavy wire 76 extending along the front and down the two ends of the bottom portion, and it might also extend along the back side of the bottom portion except that in this embodiment it is held to be unnecessary and the edge defining portion at the rear of the bottom is comprised of the wire **75*a* which is welded to the member 76 and to the other wires 75 which form the bottom. The upper edge defining portion is a heavy wire 77 extending continuously around the upper edge of the tray lying in a common plane and spaced above the plane of the bottom edge defining portion 76. Here the opposed side wall portions which rigidly connect the bottom and the upper edge defining portion are the wires 78 at each end of the tray. The arrangement of these wires 78 is more clearly understood from Fig. 37. Each of the wires has an upper portion 78*a* welded to the heavy wire 77 and extending into the tray a short distance longitudinally of the tray as clearly seen in Fig. 35. Then each wire has a generally downwardly extending portion 78*b* which next turns in a generally horizontal direction at 78*c* to form a tiering support portion or shoulder at that point. The wire then turns downwardly again at 78*d* which goes downwardly to a point of welding connection to the member 76 after which the wire runs longitudinally of the basket to join up with a similar wire side wall portion at the opposite end of the basket. In other words, a preferred form of my basket or tray utilizes a single wire extending from the top 77 at one end of the basket down and across the bottom and up the opposite end to the member 77 so as to provide the structure described. Obviously, in crossing the bottom, these wires 78 form the bottom 75 previously mentioned. It will be noted that where each wire portion 78*d* turns at the bottom to go horizontally across the bottom portion of the tray, there is a tiering support portion 78*e*** which extends laterally outside of the bottom wire 76 as clearly seen in Fig. 36. Referring to Fig. 37, it will be noted that the tiering support portion 78*e* of one of the end wires is directly below the shoulder tiering support portion 78*c* of an adjacent wire so that when one tray is tiered upon the other, as in Fig. 37, these tiering support portions engage each other and hold the two trays with their perimeters directly vertically in registration as illustrated by the dot-dash line A of Fig. 37. Please note that in Fig. 37 the wires of the upper tray have been given the same reference characters as in the lower tray but with a prime suffix.

Referring to Figs. 37 and 38, the wire portions at the ends of the basket have been arranged so that they coact very nicely for both tiering and nesting. It will be noted that the wire 76 is turned up slightly at 76*a* at the front of the basket and this is merely to prevent articles sliding out of the basket or tray. It will also be noted that the portion of the wire 76 extending across the front of the basket is inwardly from a vertical plane through the upper wire 77. In this particular tray, the front is left open at 79 although it will be understood that a solid sheet might extend across the front of the basket between the wires 76 and 77 without interfering with the operation of my invention. With the baskets in the tiered position of Fig. 37, the tiering support portions 78*e'* of the upper tray rest upon the tiering support portions 78*c* of the lower tray. Now, if the upper tray is moved upward slightly the whole upper tray may be moved toward the left as viewed in Fig. 37 maintaining the basket in a horizontal plane, and the wire 76' of the upper tray may be moved toward the wire 77 of the lower tray until the upper tray attains the dot-dash position of Fig. 38. It will be noted that the spaces between the parallel wires 78 form clearways from the level of the upper tiering support portions down to the nesting position of the trays so as to permit the movement of the upper tray from the dot-dash position of Fig. 38 to the full line position where the two rays are fully nested.

It will be noted in Figs. 35, 37 and 38 that the wires 78 at each end of the basket slope downwardly and toward the rear and at approximately the same angle of inclination. It will be noted that this direction of inclination is in the direction of the movement of the wire 76' from its dot-dash position of Fig. 38 to its full line position so as to permit this nesting action of the two trays. It will be noticed also from Fig. 38 that this causes the wire 78' of the upper tray to lie very close to the wire 78 of a lower tray in the fully nested position.

The construction of the rear wall of the basket or tray is such that it will nest with a similar like tray or receptacle. As most clearly seen in Figs. 37 and 38, some of the wires 75 forming the bottom of the tray, those extending from front to rear, are bent upward at the rear end thereof and provide portions 75*b* which form the rear wall of the tray and extend upwardly to a point near the top of the tray and are then bent outwardly as at 75*c* for a very short distance and the ends are then welded to the top wire 77. Referring to Fig. 36, where one is looking through the open front of the basket to see the rear wall thereof, the wires 75*b* are inclined downwardly and toward the right at the left half of the tray and downwardly and toward the left at the right half of the tray. In the nested position of the trays, the portions 78*b'* of an upper tray lie close to and parallel with the wires 75*b* of the lower tray. It is obvious from Fig. 36, that one could divide the basket in half along the center line and have all of the wires in the back wall inclined in one direction and still obtain a proper nesting of the baskets or trays. It is also obvious that the back wall might be of sheet material extending downwardly and inwardly from the upper wire 77 and secured properly to the bottom and one would still obtain proper nesting of two trays without interfering with the tiering action.

In Figs. 39, 40 and 41 another form of tray is shown quite similar to that just described except that both the front and rear walls of the tray are closed with a parallel wire structure like that shown on the rear wall of the basket or tray of Fig. 36. Here the bottom 80 is substantially planar and is reinforced by a heavy wire 81 which has portions 81*a* lying in the plane of the bottom and secured to the bottom forming wires, together with other portions 81*b* which are downwardly bent to provide projections for raising the bottom of the tray off of any surface on which it is resting. The width across the tray from front to rear at the bottom is less than at the top as clearly indicated in Fig. 39. The upper edge defining portion is a heavy wire 82 extending entirely around the top of the tray in a plane generally parallel to the bottom of the tray. A series of wires 83 extend in a generally parallel arrangement from front to rear of the tray. For instance, each of the wires 83 has a short horizontal portion 83*a* secured to one of the longer runs of the wire 82, then extends downwardly in an inclined direction as indicated at 83*b*, then bends to extend across the bottom of the basket at 83*c*, then upward again at 83*b* and horizontal at 83*a* where the opposite end is secured to the wire 82 along the other longer run of the tray. Both at the front and rear of the tray, the wires 83 to the left of the center line as viewed in Figs. 39 and 40 slope downwardly and toward the left, and on the right-hand side of the tray slope downwardly and toward the right. This provides a fine nesting action as indicated in Fig. 40 when two trays are nested. An extra wire 84 extends from front to rear at the mid-portion of the basket to make an even pattern on the bottom.

The two ends of the tray are identical and are as shown in Fig. 41. A plurality of wires 85 have short horizontal portions 85*a* secured to the upper wire 82, then short downwardly extending portions 85*b*, then a short horizontal shoulder portion 85*c* providing a tiering support portion there, then a further downwardly inclined portion 85*d* which bends at 85*e* to extend across the longer dimension of the basket as indicated at 85*f*. Similar bends occur at the opposite end of the basket so that the wire at its other end is finally secured again to the upper wire 82 at both ends.

Referring to Fig. 41, two like trays are shown in tiered relationship and the parts of the upper tray have been given reference characters similar to those on the lower tray with a prime suffix. It will be noted that the tiering support point 85*e* of the lower tray is directly below the tiering support portion 85*b* of the same tray so that when two trays are tiered, as in Fig. 41, the portion 85*e'* of the upper tray rests on the shoulder portion 85*c* of the lower tray so as to tier the two trays with the perimeter of the upper tray vertically in register with the perimeter of the lower tray.

To move the trays of Fig. 41 to the nested position of Fig. 40, the upper tray is lifted slightly until the tiering support portions 85*e'* clear the parts 85*a* of the lower tray, then the upper tray is moved slightly toward the left, the narrower bottom permitting this movement within the confines of the upper edge defining portion 82, until all of the wire portions 85*d'* of the upper tray lie to the left of the portions 85*b* of the lower tray. There are then clearways between the wires of the lower tray which permit the full nesting action of the two trays with the wires 85*d'* of the upper tray lying close to and along side the wires 85*d* of the lower tray, wholly analogous to the position of the wires 78 and 78' in Fig. 38.

Thus, in Figs. 35 through 41, I have shown two slightly different embodiments of my invention wherein the dimensions of the upper and lower parts of the receptacle permit the lower part of an upper receptacle to enter vertically downward into the upper part of a lower like receptacle, leaving clearance for a relatively slight shifting movement of the upper receptacle relative to the lower receptacle while moving the parts of the upper receptacle wholly in a horizontal plane. In one position of the parts, the lower tiering support portions of an upper receptacle rest vertically upon the upper tiering support portions of a lower like receptacle with the perimeter of both receptacles substantially vertically aligned. After the slight horizontal shifting motion of the upper receptacle relative to the lower receptacle, there is a clearway from the level of the upper tiering support portions downwardly permitting the two receptacles to move into a fully nested position.

What is claimed is:

1. A tray adapted for tiering and nesting with other like trays and having a bottom with a generally planar bottom edge portion, means defining an upper edge portion lying generally in a plane parallel to and spaced above said bottom edge portion, upwardly extending frame members rigidly connecting said bottom and upper edge portion defining means, said frame members sloping upwardly from said bottom in a manner facilitating nesting with a like tray, a plurality of tiering support portions rigid with one of said edge portions and adjacent thereto, other support portions on said tray near the other of said edge portions and positioned vertically in line with said tiering support portions of a like tray, the support portions near the bottom edge portion lying inside the dimensions of the upper edge portion defining means of a like tray, there being a vertically extending clearway in said tray from each of said tiering support portions to that level in the tray occupied by the bottom of a like tray when two like trays are nested, the dimensions of the upper and lower parts of said tray permitting the lower part of an upper tray to enter vertically downward into the upper part of a like tray when the upper tray is rotated at least a few degrees about a generally central vertical axis thereof relative to a like lower tray, said tiering support portions of said tray vertically clearing and passing said other support portions of a like tray when two like trays are in said rotated position and moved toward nested position, and said clearways permitting the lower part of an upper tray thereafter to pass downwardly inside a like tray to final nested position.

2. A tray as in claim 1 wherein said tiering support portions extend laterally inward from said upper edge portion.

3. A tray as in claim 1 wherein said tiering support portions extend laterally outward from said bottom edge portion.

4. A tray as in claim 1 wherein said tiering support portions extend at an angle close to ninety degrees with respect to a radius extending thereto from a central vertical axis of the tray.

5. A tray as in claim 1 wherein said tiering support portions and other support portions are oriented to give at least a spaced three-point support in tiering position.

6. A tray as in claim 1 wherein said tiering support portions and other support portions have interengaging parts in tiered position preventing lateral movement between two like trays in tiered position.

7. A tray adapted for tiering and nesting with other like trays and having a bottom with a generally planar bottom edge portion, an upper rim forming an upper edge portion lying generally in a plane parallel to and spaced above said bottom edge portion, spaced wire frame members rigidly connecting said bottom and upper rim, said frame members extending from the bottom upwardly and toward the same hand entirely around said tray, tiering support portions on at least some of said wire members near said rim comprising a short portion of each such wire frame member bent generally parallel to the associated side of said tray and then bent upwardly and there attached to said rim, other support portions on some of said wire members near said bottom and vertically beneath said tiering support portions and comprising a short portion of each such wire frame member bent generally parallel to the associated side of said tray and then bent downwardly and there attached to said bottom, there being a vertically extending clearway between said frame members from said tiering support portions to that level in the tray occupied by the bottom of a like tray when two like trays are nested, the dimensions of the upper and lower parts of said tray permitting the lower part of an upper tray to enter vertically downward into the upper part of a like tray when the upper tray is rotated at least a few degrees about a generally central vertical axis thereof relative to a like lower tray, said tiering support portions of said tray vertically clearing and passing said other support portions of a like tray when two like trays are in said rotated position and moved toward nested position, and said clearways permitting the lower part of an upper tray thereafter to pass downwardly inside a like tray to final nested position.

8. The combination of claim 7 wherein said support portions are bent toward the same hand as the inclination of said wire frame members.

9. A rectangular tray adapted for tiering and nesting with other like trays and having a generally planar bottom portion, means defining an upper edge portion lying generally in a plane parallel to and spaced from said bottom portion, frame members extending upwardly near the corners of said rectangular tray and rigidly connecting said bottom with said upper edge portion means, said frame members sloping upwardly from said bottom portion toward said upper edge portion means to facilitate nesting with a like tray, said upper edge portion means providing tiering support portions at each corner of said tray vertically above a part of said bottom portion to facilitate tiering with a like tray, there being clearways vertically below said tiering support portions to the level in the tray occupied by the bottom of a like tray when two like trays are nested, the dimensions of the lower part of one tray lying inside the dimensions of the upper part of a like tray, the dimensions of the upper and lower parts of said tray permitting the lower part of an upper tray to enter vertically downward into the upper part of a like tray when the upper tray is rotated at least a few degrees about a generally central axis thereof relative to a like lower tray, said tiering support portions of said tray vertically clearing and passing said other support portions of a like tray when two like trays are in said rotated position and moved toward nested position, and said clearways permitting the lower part of an upper tray thereafter to pass downwardly inside a like tray to final nested position.

10. The combination of claim 9 including a part rigid with said bottom portion and lying laterally to one side of a vertical projection downwardly of a tiering support portion and extending vertically beyond the level occupied by a tiering support portion of one tray in engagement with the bottom portion of a like tray whereby to limit movement laterally of an upper tray in tiering position above a lower tray.

11. A tray adapted for tiering and nesting with other like trays and having a bottom with a generally planar bottom edge portion, means defining upper edge portions lying generally in a plane parallel to and spaced above said bottom edge portion, upwardly extending frame members rigidly connecting said bottom and upper edge portions, said frame members sloping upwardly from said bottom in a manner facilitating nesting with a like tray, a plurality of tiering support portions rigid with one of said edge portions and adjacent thereto, other support portions on said tray near the other of said edge portions and positioned vertically in line with said tiering support portions of a like tray, the support portions near the bottom edge portion lying inside the dimensions of the upper edge portion defining means of a like tray, there being a vertically extending clearway in said tray from each of said tiering support portions to that level in the tray occupied by the bottom of a like tray when two like trays are nested, the dimensions of the upper and lower parts of said tray permitting the lower part of an upper tray to enter vertically downward into the upper part of a like tray and permitting said lower part of an upper tray to be shifted inside the upper part of a like tray while maintaining said bottom in substantially the same horizontal plane relative to a like lower tray, said tiering support portions of said tray vertically clearing and passing said other support portions of a like tray when two like trays are in said shifted position and moved toward nested position, and said clearways permitting the lower part of an upper tray thereafter to pass downwardly inside a like tray to final nested position.

12. The combination of claim 11 wherein said shifting of a lower part of an upper tray inside the upper part of a like tray is substantially linear.

13. A receptacle adapted for tiering and nesting with other like receptacles and having a bottom with a generally planar bottom portion, means defining an upper edge portion lying generally in a plane parallel to and spaced above said bottom portion, opposed side wall portions rigidly connecting said bottom and upper edge portions, a plurality of upper tiering support portions rigid with said upper edge portion and adjacent thereto, a plurality of lower tiering support portions rigid with said bottom portion and adjacent thereto, said lower tiering support portions substantially vertically beneath said upper tiering support portions, the dimensions of the upper and lower parts of said receptacle permitting the lower part of an upper receptacle to enter vertically downward into the upper part of a lower like receptacle leaving clearance for a relatively slight shifting movement of said upper receptacle relative to said lower receptacle moving said bottom portion of said upper receptacle wholly in a horizontally plane, in unshifted position said lower tiering support portions of an upper receptacle being positioned to rest vertically upon said upper tiering support portions of a lower like receptacle with the perimeter of said upper receptacle substantially vertically aligned above the lower receptacle, and in shifted position there being a clearway from the level of each of said upper tiering support portions down to that level in the receptacle occupied by the lower tiering support portions of a like receptacle when two like receptacles are nested, said side wall portions being so constructed and arranged that two like receptacles will nest one within another.

14. A receptacle as in claim 13 wherein said clearance between the parts of two like receptacles for said shifting movement extends horizontally and arcuately.

15. A receptacle as in claim 13 wherein said clearance between the parts of two like receptacles for said shifting movement extends horizontally and linearly.

16. A receptacle as in claim 13 wherein said opposed side wall portions comprise spaced wires extending from said upper edge portion to said bottom portion.

17. A receptacle as in claim 16 wherein said upper tiering support portions comprise generally horizontally extending shoulders formed in some of said wires.

18. A receptacle as in claim 16 wherein said wires having said shoulders are inclined in the same direction with respect to the vertical as two of said receptacles move toward nested position.

19. A receptacle, adapted for tiering and nesting with other like receptacles, having the bottom means and upwardly extending means rigidly connected with said bottom means at spaced points about the periphery of said bottom means, there being a plurality of upper tiering support portions rigid with said upwardly extending means and adjacent the upper end thereof, a plurality of lower tiering support portions rigid with one of said means and adjacent said bottom means, said upper support portions being vertically above said lower support portions, said support portions being distributed about the periphery of said bottom means and positioned to hold an upper receptacle firmly and evenly when said lower support portions of an upper receptacle engage upon said upper support portions of a lower like receptacle, there being a generally vertically extending clearway from directly above each lower point of support of an upper receptacle extending upwardly to the upper points of support of a lower receptacle when two like receptacles are nested, the dimensions of the lower part of one tray lying inside the dimensions of the upper part of a like tray, there being a generally vertically extending clearway from a point to one side of and adjacent each upper point of support extending downwardly near to the lowermost portion of the lower points of support of an upper receptacle when two like receptacles are nested, said upwardly extending means being so constructed and arranged as to nest with like parts of a like receptacle, said second named vertically extending clearways all being positioned laterally offset from the associated upper points of support so that a shifting of an upper receptacle relative to a lower receptacle from tiering position, in a direction so that all parts of the shifted receptacle move generally in horizontal planes, will place said lower points of support of an upper receptacle vertically over said second named vertically extending clearways of a lower like receptacle, after which the upper receptacle may be moved downwardly in a second like receptacle to nested position, the above named parts of a receptacle permitting nesting and tiering of two like receptacles with their like parts in vertical registration one above the other.

20. A receptacle adapted for tiering and nesting with other like receptacles and having a bottom with a generally planar bottom portion, means defining upper edges lying generally in a plane parallel to and spaced above said bottom portion, opposed side wall portions rigidly connecting said bottom and upper edges, a plurality of upper tiering support portions rigid with said upper edges and adjacent thereto, a plurality of lower tiering support portions rigid with said bottom portion and adjacent thereto, said lower tiering support portions substantially vertically beneath said upper tiering support portions, the dimensions of the upper and lower parts of said receptacle permitting the lower part of an upper receptacle to enter vertically downward into the upper part of a lower like receptacle and permitting a shifting movement of said upper receptacle relative to said lower receptacle involving moving said bottom portion of said upper receptacle generally in a horizontal plane, in unshifted position said lower tiering support portions of an upper receptacle being positioned to rest vertical upon said upper tiering support portions of a lower like receptacle with the perimeter of said upper receptacle substantially vertically aligned above the lower receptacle, and in shifted position there being a clearway from the level of each of said upper tiering support portions down to that level in the receptacle occupied by the lower tiering support portions of a like receptacle when two like receptacles are nested, said side wall portions being so constructed and arranged that two like receptacles will nest one within another.

21. A receptacle, as set forth in claim 20, with said lower tiering support portions including eyelets rigid with edges of said bottom portion.

22. A receptacle, as set forth in claim 20, with said upper tiering support portions including upwardly opening hooks located at the upper edges of said receptacle.

23. A receptacle, as set forth in claim 22, with said lower tiering support portions including eyelets rigid with edges of said bottom portion, each of said upper tiering support portions being formed by a portion laterally directed from its rigidly connected side wall portion connected to an upwardly directed portion spaced laterally from said side wall portion forming with its distal upper end the end of said hook, the dimensions of said receptacle permitting said hooks of a lower receptacle to engage in said eyelets of an upper receptacle in tiering position, said eyelets being coplanar in one plane and said hooks being coplanar in another plane parallel to said one plane.

24. A receptacle, as set forth in claim 20, with said side wall portions including at each upper tiering support portion two upwardly converging side bars, said side bars having their lower ends rigid with said bottom portion and having their upper ends rigid with and generally straddling said upper tiering support portion.

25. A receptacle, as set forth in claim 20, with said side wall portions and upper tiering support portions including at least one upper tiering support portion a wire bent upon itself at one end joining two portions of said wire extending toward one of said side wall portions to form said upper tiering support portion with these two wire portions diverging downwardly thereafter to form boundaries of the rigidly connected side wall portions.

26. A receptacle, as set forth in claim 20, with said bottom portion generally defining a rectangle, one of said upper tiering support portions and one of said lower tiering support portions being contiguous to each corner of said rectangle of said bottom portion with said side wall portions arranged along opposite sides of the rectangle of said bottom portion, said upper tiering support portions being inwardly directed from said side wall portions, said side wall portions including at each upper tiering support portion a pair of two upwardly converging side bars, said bars having their lower ends rigid with said bottom portion and generally straddling said lower tiering support portions and having their upper ends rigid with and generally straddling said upper tiering support portion.

27. A receptacle, as set forth in claim 20, with some of said portions having rigid therewith two nesting stop portions, the dimensions of said receptacle permitting one stop portion on an upper receptacle to engage vertically down onto the other stop portion on a lower receptacle in said nesting level with said receptacles vertically aligned but spaced vertically apart with their upper tiering support portions out of contact, said bottom portion having an article carrying surface, one of said stop portions including two surface portions located a spaced distance above opposite edges of said article carrying surface and extending generally parallel to said article carrying surface and rigid with said side wall portions, and the other of said stop portions including parallel bars rigidly secured below said article carrying surface.

28. A receptacle, as set forth in claim 20, with said upper tiering support portions including upwardly opening hooks located at the upper edges of said receptacle, said lower tiering support portions including eyelets rigid with edges of said bottom portion, each of said upper tiering support portions being formed by a portion laterally directed from its rigidly connected side wall portion connected to an upwardly directed portion spaced laterally from said side wall portion forming with its distal upper end the end of said hook, the dimensions of said receptacle permitting said hooks of a lower receptacle to engage in said eyelets of an upper receptacle in tiering position, said eyelets being coplanar in one plane and said hooks being coplanar in another plane parallel to said one plane, said bottom portion generally defining a rectangle, one of said upper tiering support portions and one of said lower tiering support portions being contiguous to each corner of said rectangle of said bottom portion with said side wall portions arranged along opposite sides of the rectangle of said bottom portion, said side wall portions and upper tiering support portions including at at least one upper tiering support portion a wire bent upon itself at one end joining two portions of said wire extending toward one of said side wall portions to form said upper tiering support portion with these two wire portions diverging downwardly thereafter to form boundaries of the rigidly connected side wall portions as upwardly converging side bars, said bars having their lower ends rigid with said bottom portion and generally straddling said lower tiering support portions and having their upper ends rigid with and generally straddling said upper tiering support portion, some of said portions having rigid therewith two nesting stop portions, the dimensions of said receptacle permitting one stop portion on an upper receptacle to engage vertically down onto the other stop portion on a lower receptacle in said nesting level with said receptacles vertically aligned but spaced vertically apart with their upper tiering support portions out of contact, said bottom portion having an article carrying surface, one of said stop portions including two surface portions located a spaced distance above opposite edges of said article carrying surface and extending generally parallel to said article carrying surface and rigid with said side wall portions, and the other of said stop portions including parallel bars rigidly secured below said article carrying surface.

References Cited in the file of this patent

UNITED STATES PATENTS

| | | |
|---|---|---|
| 2,684,766 | Blom | July 27, 1954 |
| 2,742,181 | Jarund | Apr. 17, 1956 |
| 2,782,936 | Lockwood | Feb. 26, 1957 |